US011991293B2

(12) United States Patent
Best et al.

(10) Patent No.: US 11,991,293 B2
(45) Date of Patent: *May 21, 2024

(54) AUTHORIZED SECURE DATA MOVEMENT

(71) Applicant: International Business Machines Corporation, Armonk, NY (US)

(72) Inventors: John Stewart Best, San Jose, CA (US); Guerney D. H. Hunt, Yorktown Heights, NY (US); Wayne C. Hineman, San Jose, CA (US); Steven Robert Hetzler, Los Altos, CA (US)

(73) Assignee: International Business Machines Corporation, Armonk, NY (US)

( * ) Notice: Subject to any disclaimer, the term of this patent is extended or adjusted under 35 U.S.C. 154(b) by 208 days.

This patent is subject to a terminal disclaimer.

(21) Appl. No.: 17/404,899

(22) Filed: Aug. 17, 2021

(65) Prior Publication Data

US 2023/0058965 A1 Feb. 23, 2023

(51) Int. Cl.
*H04L 9/32* (2006.01)
*H04L 9/08* (2006.01)

(52) U.S. Cl.
CPC ............ *H04L 9/3247* (2013.01); *H04L 9/088* (2013.01)

(58) Field of Classification Search
CPC .............................. H04L 9/3247; H04L 9/088
See application file for complete search history.

(56) References Cited

U.S. PATENT DOCUMENTS

| 7,113,615 | B2 | 9/2006 | Rhoads et al. |
| 7,181,017 | B1 | 2/2007 | Nagel et al. |
| 7,532,723 | B2 | 5/2009 | Chitrapu et al. |
| 7,548,987 | B2 | 6/2009 | Jabri et al. |
| 8,566,247 | B1 | 10/2013 | Nagel et al. |
| 8,904,181 | B1 | 12/2014 | Felsher et al. |
| 8,966,287 | B2 | 2/2015 | Bogorad |
| 9,104,618 | B2 | 8/2015 | Sela et al. |
| 9,172,529 | B2 | 10/2015 | Zaverucha |

(Continued)

FOREIGN PATENT DOCUMENTS

| CN | 111510442 A | 8/2020 |
| EP | 1220079 A2 | 7/2002 |

(Continued)

OTHER PUBLICATIONS

International Search Report and Written Opinion from PCT Application No. PCT/CN2022/104386, dated Aug. 31, 2022.

(Continued)

*Primary Examiner* — Brandon Hoffman
*Assistant Examiner* — Mayasa A. Shaawat
(74) *Attorney, Agent, or Firm* — Zilka-Kotab, P.C.

(57) ABSTRACT

A system includes an authenticated encryption layer comprising logic configured to encrypt data received at the authenticated encryption layer from an authorized application at a source node. The data is encrypted using a first key to obtain first encrypted data. The logic is configured to encrypt the first encrypted data using a second key to obtain second encrypted data and generate a watermark for the first encrypted data and/or a watermark for the second encrypted data. The logic is configured to generate a watermark token for the first encrypted data and/or a watermark token for the second encrypted data.

20 Claims, 11 Drawing Sheets

(56) References Cited

U.S. PATENT DOCUMENTS

| | | | |
|---|---|---|---|
| 9,342,466 B2 | 5/2016 | Shapiro | |
| 9,584,437 B2 | 2/2017 | Marshall et al. | |
| 9,607,131 B2 | 3/2017 | Winograd et al. | |
| 9,847,979 B2 | 12/2017 | Peterka et al. | |
| 10,033,702 B2 | 7/2018 | Ford et al. | |
| 10,476,907 B2 | 11/2019 | Hittel et al. | |
| 10,528,485 B2 | 1/2020 | Chhabra et al. | |
| 10,705,923 B2 | 7/2020 | Resch et al. | |
| 10,735,137 B2 | 8/2020 | Yanovsky et al. | |
| 10,764,254 B2 | 9/2020 | Ford et al. | |
| 10,846,377 B2 | 11/2020 | Goyal | |
| 2003/0120926 A1* | 6/2003 | Fukushima | G11B 20/00086 375/E7.009 |
| 2005/0154925 A1* | 7/2005 | Chitrapu | H04L 9/3234 726/19 |
| 2007/0230297 A1 | 10/2007 | Kitani | |
| 2017/0124558 A1 | 5/2017 | Molnar et al. | |
| 2019/0149328 A1 | 5/2019 | Van Der Velden | |
| 2019/0273607 A1* | 9/2019 | Van Der Velden | H04L 9/088 |
| 2019/0294761 A1* | 9/2019 | Kim | G06F 21/16 |
| 2020/0134207 A1 | 4/2020 | Doshi et al. | |
| 2021/0027414 A1* | 1/2021 | Dewitt | G06T 1/0021 |
| 2022/0284087 A1* | 9/2022 | Hunt | G06F 21/44 |

FOREIGN PATENT DOCUMENTS

| | | |
|---|---|---|
| WO | 2005091547 A3 | 10/2005 |
| WO | 2014147077 A1 | 9/2014 |
| WO | 2018125849 A1 | 7/2018 |

OTHER PUBLICATIONS

Chandra et al., "Content based double encryption algorithm using symmetric key cryptography," International Conference on Recent Trends in Computing (ICRTC 2015), Procedia Computer Science, Jan. 2015, 8 pages.

Anonymous, "NIST Cloud Computing Program," NIST, Information Technology Laboratory, Nov. 13, 2013, pp. 1-2, retrieved from www.nist.gov/itl/cloud/.

Mell et al., "The NIST Definition of Cloud Computing," Version 15, Oct. 7, 2009, pp. 1-2.

Mell et al., "The NIST Definition of Cloud Computing," Recommendations of the National Institute of Standards and Technology, NIST Special Publication 800-145, Sep. 2011, pp. 1-7.

CSRC, "Cloud Computing," Computer Security Resource Center, Oct. 2017, 3 pages, retrieved from https://csrc.nist.gov/projects/cloud-computing.

Hetzler et al., U.S. Appl. No. 17/138,539, filed Dec. 30, 2020.

Furtak, J., "Cryptographic Keys Generating and Renewing System for IoT Network Nodes—A Concept," Sensors, vol. 20, 2020, pp. 1-31.

Olakanmi et al., "An efficient point-to-point security solution for multihop routing in wireless sensor networks," Wiley, Special Issue Article, 2019, pp. 1-14.

Dang et al., "The Meeting of Acquaintances: A Cost-Efficient Authentication Scheme for Light-Weight Objects with Transient Trust Level and Plurality Approach," Hindawi, Security and Communication Networks, Wol. 2019, Apr. 2019, pp. 1-18.

Chan et al., "PIKE: Peer Intermediaries for Key Establishment in Sensor Networks," Proceedings IEEE 24th Annual Joint Conference of the IEEE Computer and Communications Societies, 2005, 13 pages, retrieved from https://www.semanticscholar.org/paper/PIKE%3A-peer-intermediaries-for-key-establishment-in-Chan-Perrig/49c3428dc5ce3e321e21bc5840299af9d6a30796.

Wikipedia, "Transcoding," Wikipedia, 2020, 4 pages, retrieved from https://en.wikipedia.org/wiki/Transcoding.

Wu et al., "Comprehensive VM Protection against Untrusted Hypervisor through Retrofitted AMD Memory Encryption," IEEE International Symposium on High Performance Computer Architecture, 2018, pp. 441-453.

Hetzler et al., U.S. Appl. No. 17/138,552, filed Dec. 30, 2020.

Hunt et al., U.S. Appl. No. 17/193,905, filed Mar. 5, 2021.

\* cited by examiner

700

- Receive Second Encrypted Data, Watermarks, and a First Watermark Token from Data Storage in Response to a Data Request from a Destination Node Outside of an Authorized Encryption Trust Zone, Wherein the Second Encrypted Data is Data that Has Been Encrypted In a First Key to Create First Encrypted Data that is then Encrypted In a Second Key to Create the Second Encrypted Data, Wherein the Watermarks Include a First Watermark Generated for the First Encrypted Data and a Second Watermark Generated for the Second Encrypted Data, Wherein the First Watermark Token is Generated for the First Encrypted Data — 702

- Verify the Second Watermark Generated for the Second Encrypted Data — 704

- In Response to Verification of the Second Watermark, Decrypt the Second Encrypted Data Using the Second Key to Obtain the First Encrypted Data — 706

- Verify the First Watermark Generated for the First Encrypted Data — 708

- In Response to Verification of the First Watermark, Send the First Encrypted Data to a Trusted Verifier, Wherein the Trusted Verifier is Configured to Verify the First Watermark Token Generated for the First Encrypted Data — 710

- In Response to Receiving Verification of the First Watermark Token Generated for the First Encrypted Data from the Trusted Verifier, Encrypt the First Encrypted Data with a Third Key to Create Third Encrypted Data — 712

- Generate a Third Watermark and/or a Third Watermark Token for the Third Encrypted Data — 714

- Send the Third Encrypted Data, the Watermarks, and the Watermark Token(s), Including the Third Watermark and/or the Third Watermark Token, to an Authorized Destination — 716

Receive, by a Trusted Verifier, Inner Encrypted Data Based at Least in Part On a Data Request from a Destination Node Outside of an Authorized Encryption Trust Zone, Wherein the Inner Encrypted Data is Data that has been Encrypted in an Inner Key to Create the Inner Encrypted Data — 802

Verify, by the Trusted Verifier, an Inner Watermark Token Generated for the Inner Encrypted Data, Wherein the Inner Watermark Token is Generated for the Inner Encrypted Data — 804

FIG. 8

AUTHORIZED SECURE DATA MOVEMENT

BACKGROUND

The present invention relates to encryption, and more particularly, this invention relates to authorized secure data movement in storage systems and networks such as cloud-based storage systems.

It is desirable to securely share data between computer nodes. Secure data transfer is especially beneficial for providing compute functions near stored data. For example, each node may have a specific compute function (e.g., a database, an inference engine, etc.). Access controls are conventionally used in prior art approaches to limit data sharing. Access controls are not foolproof and may lead to data leakage. For example, privileges may be escalated, the controls may be misconfigured, etc.

Unauthorized encryption of data, such as by an attacker encrypting a victim's data with a key unknown to the victim, is a major security issue. Such ransomware-type attacks create a denial of service for the victim, which can be expensive or impossible to recover from. For example, such attacks include ransomware attacks, where a ransom is demanded in exchange for the encryption key needed to unlock the victim's data.

Malware may also and/or alternatively carry out unauthorized data transfer (e.g., data is copied, transferred, retrieved, etc.) without authorization in exfiltration-type attacks.

What is needed is a way to ensure that encrypted data in a system has been encrypted in an authorized manner such that the data owner is able to decrypt the data.

BRIEF SUMMARY

A system, according to one aspect, includes an authenticated encryption layer comprising logic configured to encrypt data received at the authenticated encryption layer from an authorized application at a source node. The data is encrypted using a first key to obtain first encrypted data. The logic is configured to encrypt the first encrypted data using a second key to obtain second encrypted data and generate a watermark for the first encrypted data and/or a watermark for the second encrypted data. The logic is configured to generate a watermark token for the first encrypted data and/or a watermark token for the second encrypted data. The watermarks and/or watermark tokens are used to verify that the encryption was performed by the authorized encryption layer and not an unauthorized process. Ransomware-type attacks are thereby beneficially blocked.

In one optional aspect, the authenticated encryption layer comprises logic configured to cause the second encrypted data and the generated watermark(s) to be stored in data storage. Each generated watermark is generated using a respective watermark key. The watermarks and their respective watermark keys enable selective, concurrent sharing of encrypted information where authorized users have different keys, and the owner of the data may selectively revoke access to the authorized users.

A computer-implemented method, according to another aspect, includes receiving second encrypted data, watermarks, and a first watermark token from data storage in response to a data request from a destination node outside of an authorized encryption trust zone. The second encrypted data is data that has been encrypted in a first key to create first encrypted data that is then encrypted in a second key to create the second encrypted data. The watermarks include a first watermark generated for the first encrypted data and a second watermark generated for the second encrypted data. The first watermark token is generated for the first encrypted data. The method includes verifying the second watermark generated for the second encrypted data and, in response to verification of the second watermark, decrypting the second encrypted data using the second key to obtain the first encrypted data. The method further includes verifying the first watermark generated for the first encrypted data and, in response to verification of the first watermark, sending the first encrypted data to a trusted verifier. The trusted verifier is configured to verify the first watermark token generated for the first encrypted data and, in response to receiving verification of the first watermark token generated for the first encrypted data from the trusted verifier, the method includes encrypting the first encrypted data with a third key to create third encrypted data. The method further includes generating a third watermark and/or a third watermark token for the third encrypted data and sending the third encrypted data, the watermarks, and the watermark token(s), including the third watermark and/or the third watermark token, to an authorized destination. An authorized destination is configured to verify the third watermark and/or the third watermark token and, upon successful verification of the third watermark and/or the third watermark token, the authorized destination may decrypt the third encrypted data using the third key to obtain the first encrypted data (e.g., the data in the clear). The third encrypted data provides an additional layer of protection from attack.

In one optional aspect, the trusted verifier includes a prefilter function configured to verify that the data is not encrypted. The trusted verifier only sends the verification in response to successful verification that the data is not encrypted. The prefilter function provides the benefit of being able to determine whether the data is encrypted in any encryption key and prevent further processing of contaminated data. For example, the data may be encrypted by an attacker having substituted encrypted text for plain text.

A computer-implemented method, according to another aspect, includes receiving, by a trusted verifier, inner encrypted data based at least in part on a data request from a destination node outside of an authorized encryption trust zone. The inner encrypted data is data that has been encrypted in an inner key to create the inner encrypted data. The method includes verifying, by the trusted verifier, an inner watermark token generated for the inner encrypted data, wherein the inner watermark token is generated for the inner encrypted data. The trusted verifier enables verification of the watermark of authorized encrypted data without the trusted verifier having enough information to allow a counterfeit watermark to the replace the original watermark.

In one general aspect, the data request is a data write request and the method includes, in response to successful verification of the inner watermark token, decrypting, by the trusted verifier, the inner encrypted data using the inner key to obtain the data and determining, by the trusted verifier, that the data is unencrypted using a prefilter function. The method further includes returning, by the trusted verifier, a first verification message to a transcoder in response to successful verification of the inner watermark token and the determination that the data is unencrypted. The prefilter function provides the benefit of being able to determine whether the data is encrypted in any encryption key and prevent further processing of contaminated data.

Other aspects and approaches of the present invention will become apparent from the following detailed description, which, when taken in conjunction with the drawings, illustrate by way of example the principles of the invention.

BRIEF DESCRIPTION OF THE DRAWINGS

FIG. 7 is a flowchart of a method, in accordance with one aspect of the present invention.

FIG. 8 is a flowchart of a method, in accordance with one aspect of the present invention.

DETAILED DESCRIPTION

Figure 1:
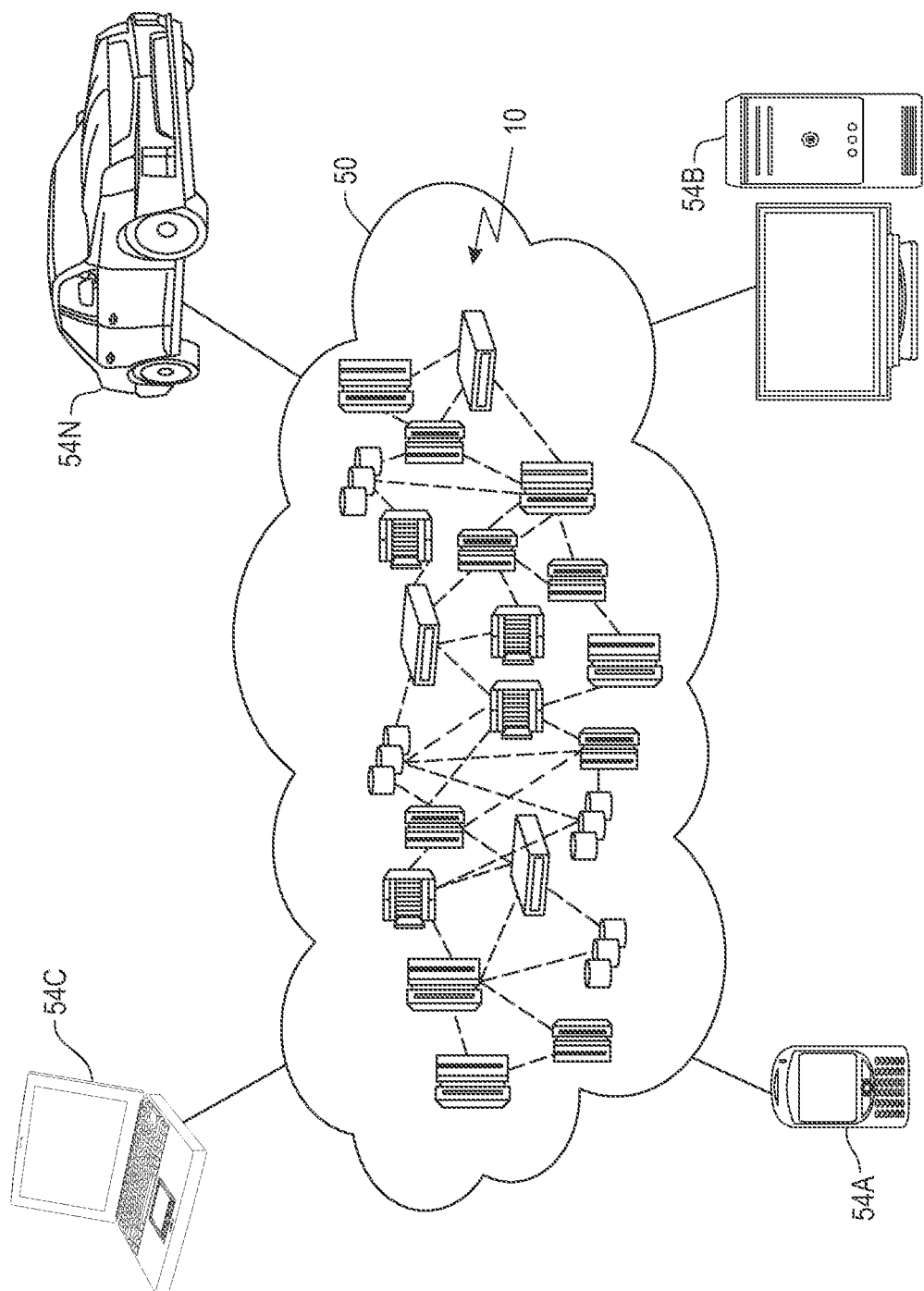
FIG. 1 depicts a cloud computing environment in accordance with one aspect of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several aspects of detecting unauthorized key use in secure sharing using authorized verifiers which are provided enough information to verify the watermark of authorized encrypted data, but not enough information to allow a counterfeit watermark to replace the original.

In one general aspect, a system includes an authenticated encryption layer comprising logic configured to encrypt data received at the authenticated encryption layer from an authorized application at a source node. The data is encrypted using a first key to obtain first encrypted data. The logic is configured to encrypt the first encrypted data using a second key to obtain second encrypted data and generate a watermark for the first encrypted data and/or a watermark for the second encrypted data. The logic is configured to generate a watermark token for the first encrypted data and/or a watermark token for the second encrypted data.

In another general aspect, a computer-implemented method includes receiving second encrypted data, watermarks, and a first watermark token from data storage in response to a data request from a destination node outside of an authorized encryption trust zone. The second encrypted data is data that has been encrypted in a first key to create first encrypted data that is then encrypted in a second key to create the second encrypted data. The watermarks include a first watermark generated for the first encrypted data and a second watermark generated for the second encrypted data. The first watermark token is generated for the first encrypted data. The method includes verifying the second watermark generated for the second encrypted data and, in response to verification of the second watermark, decrypting the second encrypted data using the second key to obtain the first encrypted data. The method further includes verifying the first watermark generated for the first encrypted data and, in response to verification of the first watermark, sending the first encrypted data to a trusted verifier. The trusted verifier is configured to verify the first watermark token generated for the first encrypted data and, in response to receiving verification of the first watermark token generated for the first encrypted data from the trusted verifier, the method includes encrypting the first encrypted data with a third key to create third encrypted data. The method further includes generating a third watermark and/or a third watermark token for the third encrypted data and sending the third encrypted data, the watermarks, and the watermark token(s), including the third watermark and/or the third watermark token, to an authorized destination.

In another general aspect, a computer-implemented method includes receiving, by a trusted verifier, inner encrypted data based at least in part on a data request from a destination node outside of an authorized encryption trust zone. The inner encrypted data is data that has been encrypted in an inner key to create the inner encrypted data. The method includes verifying, by the trusted verifier, an inner watermark token generated for the inner encrypted data, wherein the inner watermark token is generated for the inner encrypted data.

It is to be understood that although this disclosure includes a detailed description on cloud computing, implementation of the teachings recited herein are not limited to a cloud computing environment. Rather, aspects of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
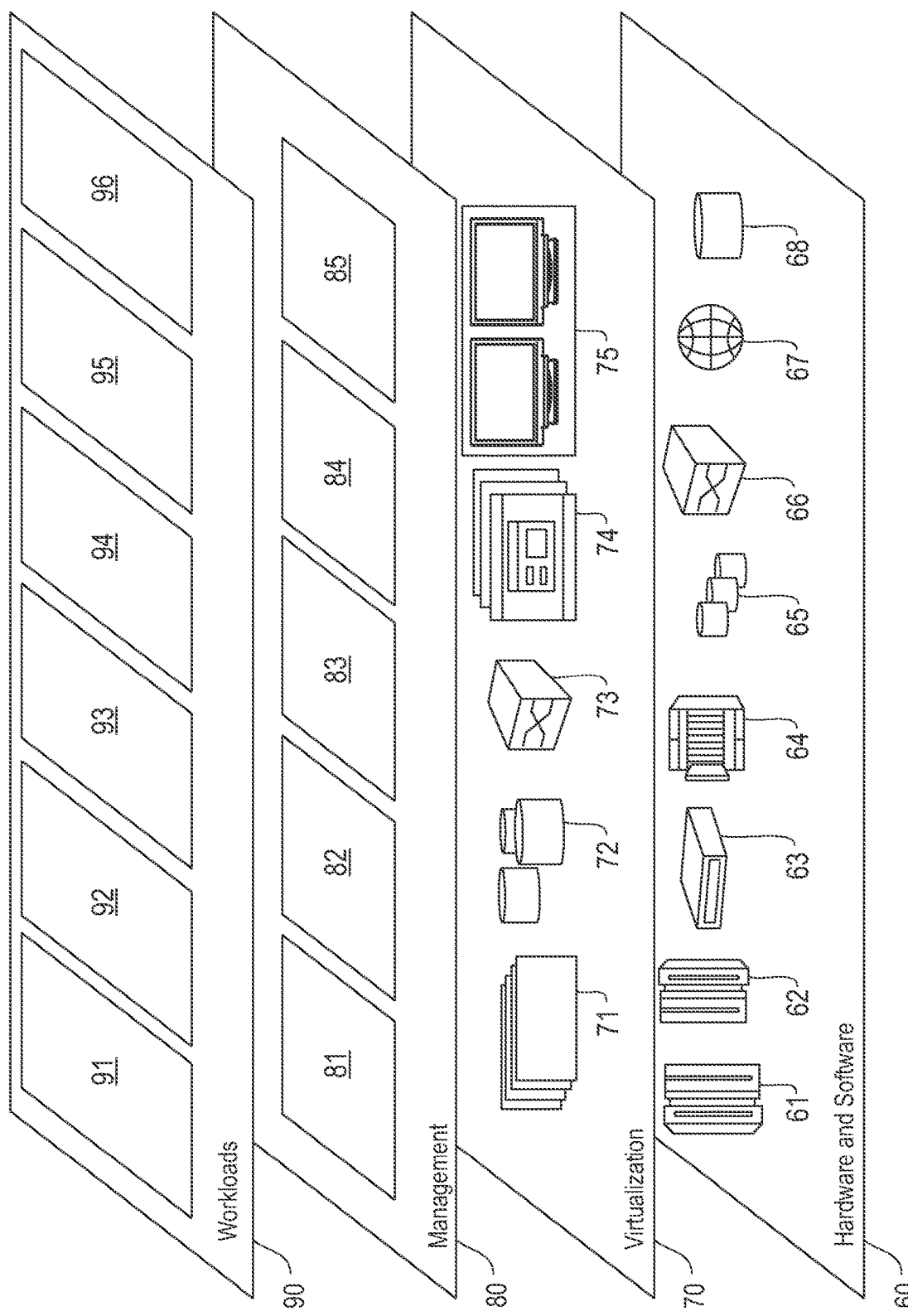
FIG. 2 depicts abstraction model layers in accordance with one aspect of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and aspects of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some aspects, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and authorized secure data movement 96.

Unauthorized encryption of data, such as by an attacker encrypting a victim's data with a key unknown to the victim, is a major security issue. Such ransomware attacks create a denial of service for the victim, which can be expensive or impossible to recover from. At least some aspects of the present disclosure provide a method for detecting unauthorized key use in secure sharing using an authorized verifier that is given enough information to verify the watermark of authorized encrypted data, but not enough information to allow a counterfeit watermark to the replace the original. Accordingly, at least some aspects of the present disclosure provide a method for ensuring that encrypted data in a system has been encrypted in an authorized manner such that the data owner is able to decrypt the data. The encryption is authenticated by the creation of "watermarks" which verify that the encryption was performed by the authorized encryption layer and not an unauthorized process. Ransomware-type attacks are thereby beneficially blocked. Exfiltration-type attacks are highly restricted by requiring data to be encrypted using authorized encryption by authenticated and/or attested applications which are allowed to use the authorized encryption.

At least some aspects of the present disclosure enable secure data movement using double encryption to safely share data between users. Data which is doubly encrypted as referred to throughout the present disclosure includes data which is encrypted a first time with a first key to create "inner encrypted data" and then the inner encrypted data is encrypted with a second key to create "outer encrypted data." Doubly encrypted data may be used interchangeably with "outer encrypted data" throughout the present disclosure, unless otherwise noted herein. Similarly, "inner encrypted data" may be used interchangeably with "first encrypted data" throughout the present disclosure, unless otherwise noted herein.

Various aspects of secure data movement use a secure transcoder which is only given outer keys (e.g., such that the secure transcoder does not see the data in the clear during the transcoding process). The destination may be given only the inner key, thereby preventing direct access to, and the ability to, directly read and decrypt data in the storage system. Data written in the storage system by the destination is encrypted in an outer key received from the transcoder and an inner key received from the source. At least some of the aspects described herein improve secure data movement using authorized encryption by modifying the secure transcoder and using a secure verifier element.

Authenticated encryption (e.g., "authencrypt") and authencrypt engines as described herein use keys which are known to the system. Registered keys may be generated and/or stored in key servers and registered keys are only available for authencrypt. Registered keys are unavailable to applications, in preferred aspects. Keys which are not known to the system cannot (e.g., will not) be used by authencrypt. Authencrypt may only be used by authorized applications. In various approaches, a policy manager retains authorization information for the applications in a manner known in the art. For example, a policy may be implemented in an eXtensible Access Control Markup Language (XACML) derivative with associated policy enforcement points, policy decision points, etc. Unauthorized encryption is blocked at storage accordingly. An authorized encryption function may reside at the host and an authencrypt verification function may reside at the storage and/or at a secure transcoder, in various approaches.

In one exemplary illustrative aspect, an authencrypt system includes a host with the ability to write to storage. An authorized application passes all data to be encrypted to an authencrypt engine. Encryption keys are generated and stored in a key server. In some aspects, keys may be supplied by the application. The authencrypt engine verifies that the data is not already encrypted. If the data is encrypted, the request is rejected, according to at least some aspects described herein. Ransomware is unable to place encrypted data into storage. If the ransomware uses its own encryption key, the data encrypted with the ransomware's encryption key is detected and blocked from being written to storage. If the data is not encrypted, the authencrypt engine passes the data through an encryption engine that encrypts the data with a key associated with the request. The encryption engine (e.g., an authorized encryption function) may be encapsulated, such as in hardware, an accelerator, a trusted execution environment, etc., which increases the security for the keys and the encryption process generally. After encryption, the data is watermarked using a watermark key prior to passing the encrypted data to the storage system. The storage system has access to the watermark key server and can verify that the encryption is authorized (e.g., checks whether the watermark is valid), prior to writing the data to the storage. When the storage system receives the data and the watermark, the storage system independently accesses the watermark key server and computes the watermark to verify that the data was not modified. The data is only written to the storage if the watermark verification is successful. In preferred aspects, all data written to storage is stored using authorized encryption and plain text is not stored in storage. Encryption and decryption are preferably limited to authorized applications. Access to encryption keys is limited to the authorized encryption trust zone. Attempts to write unauthorized encrypted data are detected and blocked at storage (e.g., the unauthorized encrypted data is not stored). Authorizing a new application may require attestation of the application and/or multi-party manual authorization, in a manner known in the art. In preferred aspects, only authorized applications encrypt data using a double encryption engine. All encryption may be done using double encryption engine(s), in at least some aspects. At least some aspects of the present disclosure expand upon authorized encryption by implementing a secure transcoder in the watermark verification and authentication process.

In various aspects, it is assumed that all communications between disjoint components occur over mutually authenticated secure (e.g., encrypted) sessions. It may also be assumed that all data that is stored in the system is encrypted. A provision for unencrypted data may be included, in at least some approaches, but unencrypted data may be unprotected from exfiltration.

At least some of the aspects described herein are advantageously usable with symmetric encryption techniques resulting in relatively higher performance compared to relatively slower, public key encryption methods of transferring data between nodes in a system.

According to various aspects of the present disclosure, the following terms may be defined, respectively. It should be understood by one having ordinary skill in the art that the following terms are not limited to the definitions as provided immediately below. Rather, these definitions are exemplary and may include more or less scope as elaborated upon in accordance with various aspects of the present disclosure.

A node, as used throughout the present disclosure, may refer to a system or component which processes application data. A node may include a computer, a CPU processor, a GPU processor, a virtual machine instance, a container, any other processing element, etc., or any combination thereof.

A watermark token, as used throughout the present disclosure, may refer to a unique identifier calculated from encrypted data, a watermark key, another watermark token, etc. A watermark token may be calculated using a keyed hash such as a hash-based message authentication code (HMAC), in at least some approaches. Watermark tokens may be generated efficiently using authentication encryption mode, such as an offset code book mode (OCB), integrity aware parallelizable mode (IAPM), etc. In at least some approaches, watermark tokens may be generated using additional information such as a logical block address (LBA), a sequence number, etc., to avoid substitution attacks. The authentication token generated during encryption by the foregoing modes may be used as the watermark token on that encrypted data, in at least one approach. In the foregoing approach, the tokens are verified upon decryption. In preferred aspects, watermark tokens are used to generate watermarks. Accordingly, an entity having access to encrypted data and the watermark key will not be able to generate a valid watermark without having access to the valid watermark token and/or valid watermark token key.

In at least one aspect, a watermark token may be verified without access to a stored watermark token if a trusted verifier has access to the watermark token key. Verification is accomplished by regenerating the watermark token and using the regenerated watermark token to verify the stored watermark (e.g., which was generated using the watermark token). In an alternative aspect, the watermark token does not have to be written to storage. However, if the watermark token is not written to storage, a user outside of the trust zone cannot verify the watermarks without access to the watermark token key. Watermark verifiers without access to the watermark token key, such as those located on storage and watermark verifiers associated with users outside of the trust zone, must be provided access to the watermark token. In an alternative embodiment where the watermark token is not used to generate the watermark, watermarks and watermark tokens are independent and may therefore be independently stored and verified.

A watermark, as used throughout the present disclosure, may be a unique identifier calculated from encrypted data, a watermark key, a watermark token, etc. A watermark may be calculated using a keyed hash such as a hash-based message authentication code (HMAC), in at least some approaches. Watermarks on encrypted data may refer to any watermarks and/or watermark tokens calculated on encrypted data, in at least some aspects. Watermarks may be generated with or without watermark tokens. For example, watermarks and watermark tokens may be generated separately with different keys (e.g., a watermark key and a watermark token key).

Watermark token keys may be shared only with modules which are authorized to decrypt the data on which the token is generated. The final destination of encrypted data (e.g., where the data is used) preferably verifies the watermark and the watermark token at all levels (e.g., inner and outer, including watermarks and watermark tokens for each level, etc.).

An authencrypt trust zone, as used throughout the present disclosure, comprises a set of systems and components which are mutually authenticated for generation and use of watermark tokens and watermarks with authorized access to a common watermark key manager and common encryption key manager. The mutual authentication enables writes to storage where the storage is configured to verify that unauthorized encryption is not performed on data written to storage. Nodes outside of the authencrypt trust zone may also use authencrypt and share watermark keys between zones with watermark keys generated for sharing, in at least some aspects.

In some aspects, nodes outside of the authencrypt trust zone cannot be trusted to perform all authencrypt operations and additional verification is used on receiving data from nodes outside of the authencrypt trust zone. Watermarks and watermark keys originating outside of the authencrypt trust zone cannot be fully trusted and must be verified by nodes inside the authencrypt trust zone, in at least some approaches. These watermarks are regenerated using trusted watermark keys when received by a secure transcoder inside the authencrypt trust zone, in preferred aspects. Data received from outside of the authencrypt trust zone may be watermarked and double encrypted. The watermarks should be verified if the watermarks and watermark keys are available but cannot be fully trusted.

A double authencrypt engine, according to at least some of the aspects described herein, is an authorized encryption engine which comprises a prefilter to verify that input data is unencrypted, a first encryption engine which uses a first encryption key to generate first encrypted data, a second encryption engine which uses a second encryption key to generate second encrypted data, and a watermark generator to generate watermarks on the first encrypted data and/or the second encrypted data. The first encryption engine and the second encryption engine may be implemented with the same hardware and/or software modules, in at least some approaches. The prefilter preferably determines if the data it receives has been encrypted. The prefilter may be implemented in hardware and/or a software program to perform analysis in the data (e.g., to determine whether the data is encrypted). The prefilter may use statistical analysis and/or any other means known in the art to determine whether the data is encrypted, in a manner which would become apparent to one having ordinary skill in the art upon reading the present disclosure. The prefilter beneficially is able to determine whether the data is encrypted in any encryption key and prevent further processing of contaminated data. For example, the data may be encrypted by an attacker having substituted encrypted text for plain text, etc.

A double authencrypt engine, according to an exemplary aspect of the present disclosure, performs a method comprising verifying that incoming data is unencrypted, encrypting the incoming data using a first key to generate first encrypted data, encrypting the first encrypted data using a second key to generate second encrypted data, and generating watermarks for the first encrypted data and/or the second encrypted data.

In at least some approaches, a verifier receives inner encrypted data and/or determines that decrypted data is not encrypted. A verifier may be interchangeably referred to as a secure verifier, an authorized verifier, a trusted verifier, etc., throughout the present disclosure. The verifier preferably has access to the encryption key used to encrypt the data and uses the encryption key to decrypt the data. The decrypted data may pass from the verifier through the verifier's prefilter to verify (e.g., determine) that the data is not encrypted, in some aspects. In various aspects, the verifier has access to the watermark token key and the watermark on the encrypted data for enabling verification of the watermark token on the encrypted data. A new secure watermark token may be generated by the secure verifier, in some approaches. In an alternative implementation, the secure verifier receives doubly encrypted data along with the inner and outer watermarks, watermark tokens, and encryption keys. It verifies all watermarks, decrypts the data and verified that the original data was not encrypted.

According to at least some aspects of the present disclosure, inner encrypted data is the first encrypted data that has been encrypted once by a double encryption engine and outer encrypted data is the encrypted data resulting from encrypting the inner encrypted data. Outer encrypted data may be referred to as the second encrypted data generated by another double encryption engine. When outer encrypted data is generated by a transcoder or by a destination transferring data to a transcoder, this data may be referred to as third encrypted data, in at least some aspects. Third encrypted data may be generated by decrypting outer encrypted data, resulting in inner encrypted data, and re-encrypting the inner encrypted data with a new encryption key.

The secure transcoder may have various properties, according to the desired implementation. For example, in an exemplary implementation, the secure transcoder does not transcode the inner watermarks and does transcode the outer watermark. In the foregoing implementation, the transcoder verifies the outer watermark and the outer watermark token to protect against the storage falsifying data and/or the outer watermark. The transcoder may generate new outer watermark tokens and new outer watermarks. The transcoder may send the original inner watermarks and the new outer watermarks to the destination. The destination preferably has access to the original inner watermark token key and the inner watermark key, in addition to the transcoded outer watermark token and watermark keys. The destination verifies all watermarks and watermark tokens, in a manner which would become apparent to one having ordinary skill in the art upon reading the present disclosure.

In another exemplary implementation, the secure transcoder additionally verifies the inner watermark, but not the inner watermark token. The inner watermark key is shared with both the secure transcoder and the destination. The inner watermark token key is only shared with the destination. This exemplary implementation provides the maximum early detection of problems while minimizing trust of the secure transcoder.

In an alternative exemplary implementation, all watermarks and watermark keys are transcoded (e.g., the secure transcoder has access to all of the watermark keys). The destination can then verify all watermarks and watermark keys (e.g., where the destination has access to the keys used to generate the transcoded watermarks). This alternative implementation requires additional trust for the secure transcoder.

In various aspects of the present disclosure, it should be understood by one having ordinary skill in the art that any verification described herein may be deemed "successful" (e.g., valid) or "unsuccessful" (e.g., invalid). The purpose of verification is to determine if a watermark is valid. For example, any watermark verification described herein may be deemed "successful" if the watermarks "match." In some approaches, the watermarks must be identical to be considered a "match." In other approaches, a predefined portion, percentage, sub-component, etc., of the watermarks must match. Similarly, any watermark token verification described herein may be deemed "successful" if the watermark tokens "match." In response to an unsuccessful verification (e.g., the verification "fails") any data, watermarks, watermark tokens, etc., may be blocked from further processing (e.g., an indication of the unsuccessful verification may be sent to the requestor, an error may be output, the data may be blocked from further encryption, the write and/or read request is denied, etc.). The error may be logged and/or an alert sent to a user, in at least some approaches. In one approach, more than one verification may be attempted prior to blocking from further processing. In another approach, the system may have a mechanism for recovering data that has failed, such as reconstructing the block when the storage is configured as a random array of independent disks (RAID), as would be understood by one having ordinary skill in the art.

Any aspect of the present disclosure may be applied to data stored in memory, persistent memory, nonvolatile storage, etc., or any combination thereof, in a manner which would become apparent to one having ordinary skill in the art upon reading the present disclosure.

Figure 3:
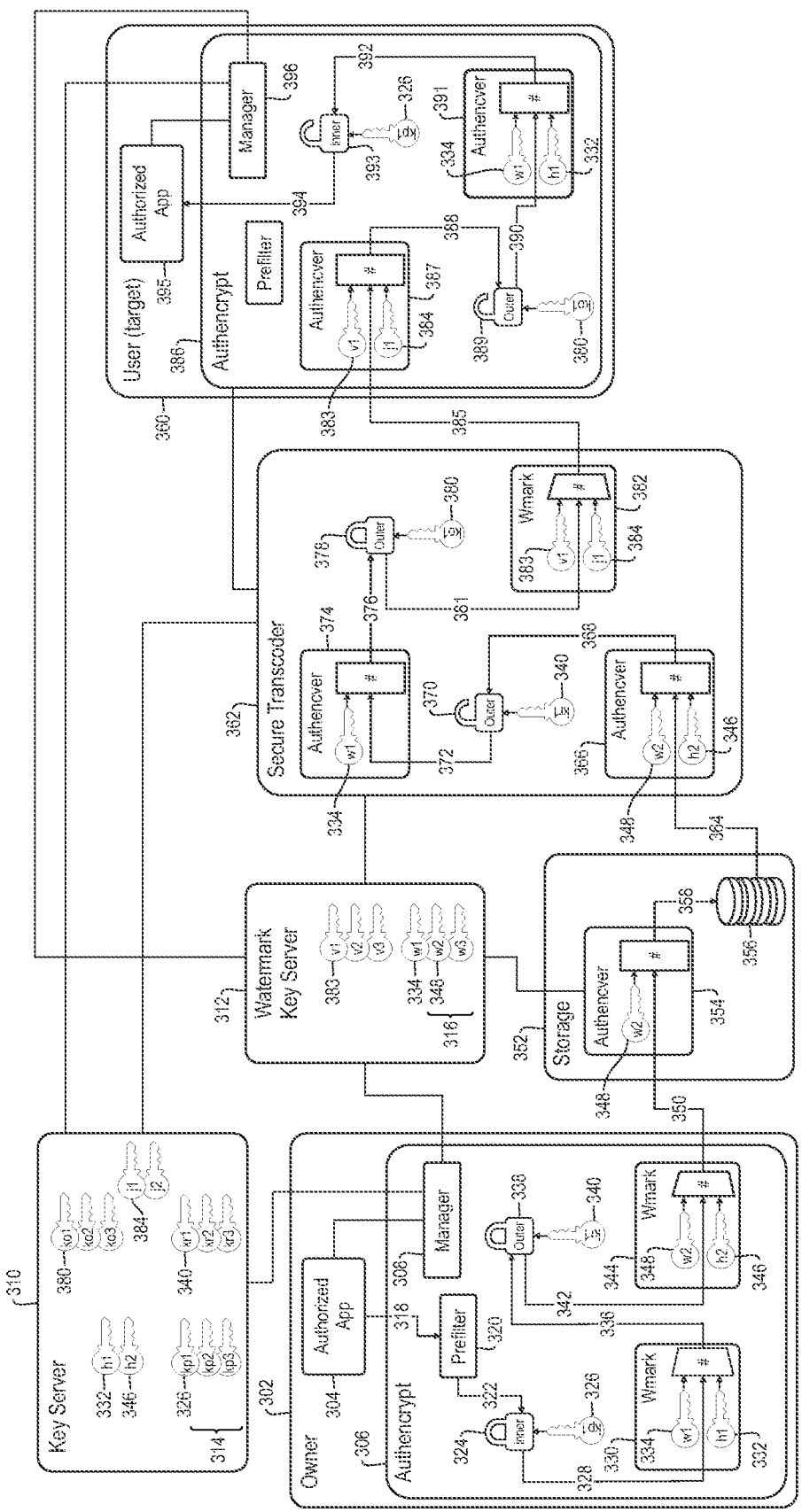
FIG. 3 is a diagram of a high level architecture, in accordance with one aspect of the present invention.

As shown in FIG. 3, an exemplary implementation of authorized secure data movement using dual watermarks (e.g., watermark tokens and watermarks are generated on both the first (e.g., inner) and second (e.g., outer) encrypted data). Two watermark token keys and two watermark keys are used. In an exemplary approach, on a write direct from a source (and/or from a destination via a secure transcoder, see FIG. 4) to storage, the storage verifies the outer watermark based on the outer watermark key and the outer watermark token.

FIG. 3 is a diagram of a high-level architecture, in accordance with various configurations. The architecture 300 may be implemented in accordance with the present invention in any of the environments depicted in FIGS. 1-2 and 4-11, among others, in various configurations. Of course, more or less elements than those specifically described in FIG. 3 may be included in architecture 300, as would be understood by one of skill in the art upon reading the present descriptions.

Architecture 300 illustrates an exemplary data system, according to one aspect. Architecture 300 includes an owner 302 (e.g., a host system) which generates data and commits the data to persistent data storage. Owner 302 comprises at least one authorized application 304 and a double authencrypt engine 306. The double authencrypt engine 306 may interchangeably be referred to as an authorized encryption function or an authencrypt engine, throughout the present disclosure.

An exemplary operation for encrypting data sent from authorized application 304 is shown in FIG. 3. FIG. 3 depicts an exemplary authorized data transfer where both sides (e.g., a host and a target) have access to the same key server and the same watermark key server. In preferred aspects, the authorization of the authorized application 304 is checked and permission to use the double authencrypt engine 306 for the authorized application 304 is authenticated prior to sending data. In a preferred aspect, the authorized application 304 requests authorization to use authencrypt from the manager 308 prior to sending data. The manager 308 may check whether a system policy engine (not shown) gives permission to the application and issues the appropriate credential. In an alternative aspect, if the application is already authorized, those credentials would be presented to the manager 308 prior to utilizing authencrypt. Those skilled in the art understand that authencrypt may be implemented as a shared system function or a pre-application service. The credentials may be unique to each instance of an application and utilized to assure that all of the meta data and keys are appropriately correlated. The permissions may be checked in any manner known in the art, with different levels of security, as would become apparent to one having ordinary skill in the art upon reading the present disclosure. In one approach, an allow-list may be used. In another approach, application secure hashes may be checked. In yet another approach, full application attestation with an authority may be performed. If the application fails to obtain encryption permission, the processing of the data is blocked, e.g., the data is not encrypted via authorized encryption. In at least some approaches, a notification may be logged and/or an alert may be sent to an administrator indicating that an unauthorized application has attempted to access authencrypt.

Once the application is authorized (e.g., the authorized application 304), the authorized application 304 arranges through a manager 308 for a selected set of encryption keys 314 held by a key server 310 and associated watermark keys 316 held by a watermark key server 312 to be used for encryption and watermarking of data generated by the authorized application 304. Each encryption key may be associated with the authorized application 304. In one approach, each system may have a single encryption key which is used for each of the system's authorized applications. In another approach, each encryption key may be a function of the application, the user, the system owner, the data set, a set of files, a set of volumes, etc. Any of the foregoing information may be sent as a request for access by the authorized application 304 to the manager 308. The manager 308 may generate a new key and/or determine the identity of an encryption key, watermark key, etc., associated with the request. The manager 308 may send this information (e.g., a request for a new key or information associated with the identity of an encryption key and/or watermark key associated with the request) to the key server 310 and/or the watermark key server 312.

In an alternative approach, the key server 310 and/or the watermark key server 312 performs key generation in response to a request to the key server 310 and/or the watermark key server 312 from the manager 308 for generation of a new key.

In preferred aspects, the manager 308 is incorporated into the double authencrypt engine 306. The manager 308 may be incorporated in a TEE in the host (e.g., exterior to the double authencrypt engine 306), in some approaches. In yet further approaches, the manager 308 may be incorporated in the key server 310, the watermark key server 312, a separate secure component such as an HSM or a TEE in another host, etc. In each of these alternative approaches, all the links between the manager 308 and other components are secured with authentication, encryption, integrity protection, etc., for security of the data.

In preferred aspects, the key server 310 holds at least one set of encryption keys 314 that the double authencrypt engine 306 uses to encrypt the data. In further preferred approaches, the set of encryption keys 314 stored in the key server 310 is not available to the authorized application 304.

Similarly, the watermark keys 316 stored in the watermark key server 312 are not available to the authorized application 304. The manager 308 may generate new keys, in some approaches. In preferred approaches, the manager 308 is securely isolated from the authorized application 304 in a manner known in the art including via a hardware security module (HSM), a trusted execution environment (TEE), etc. Key delivery according to various aspects described herein may be performed in a secure manner, such as over an encrypted link or using a secure key exchange protocol.

Data generated by the authorized application 304 is transferred in operation 318 to a prefilter 320 in the double authencrypt engine 306. The prefilter 320 verifies that the data has not been previously encrypted. If the data is not encrypted (e.g., the verification is successful), the data is transferred in operation 322 to an inner encrypter 324. The inner encrypter 324 obtains an inner encryption key 326 from the set of encryption keys 314 located in the key server 310. The inner encryption key 326 may be selected from the set of encryption keys 314 based on policies established between the authorized application 304 and the manager 308 for the set of data to be written. The inner encrypter 324 encrypts the data using the inner encryption key 326 and transfers the encrypted data (e.g., inner encrypted data) in operation 328 to the inner watermark generator 330. The inner watermark generator 330 obtains the inner watermark token key 332 and the inner watermark key 334 associated with the inner encryption key 326 for generating an inner watermark token and inner watermark. The inner watermark generator 330 generates an inner watermark token and an inner watermark on the inner encrypted data. The inner encrypted data is passed in operation 336 to the outer encrypter 338. The outer encrypter 338 encrypts the inner encrypted data using the outer encryption key 340 obtained from the key server 310 to generate outer encrypted data. The outer encrypted data is transferred in operation 342 to an outer watermark generator 344. The outer watermark generator 344 obtains an outer watermark token key 346 and an outer watermark key 348 for generating an outer watermark token and an outer watermark. The outer watermark generator generates the outer watermark token and the outer watermark on the outer encrypted data. The double authencrypt engine 306 transfers the outer encrypted data, the inner watermark token, the inner watermark, the outer watermark token, and the outer watermark in operation 350 to the storage system 352.

Storage system 352 may include further encryption of the encrypted data and the associated watermarks and/or watermark tokens. Additional encryption may be securely implemented to prevent an attacker from using the additional encryption as a means to encrypt data such that the owner of the data is unable to decrypt the data (e.g., get back the data that was passed to the storage system). One secure implementation of additional encryption may include self-encrypting storage units.

The storage system 352 may support the storing of unencrypted data, in some aspects. For storing unencrypted data, the prefilter function (e.g., prefilter 320) may be added to the storage system 352 such that the storage system 352 can distinguish between encrypted data and plain text data (e.g., data in the clear, unencrypted data, etc.), reject unauthorized encryption, and thereby allow plain text data to be stored. Allowing the storage of plain text reduces the security against exfiltration attacks for the plain text data and should be limited to data of low sensitivity to unauthorized publication, in a manner which would be determinable by one having ordinary skill in the art.

In various approaches, each watermark generator described herein may use any number of methods for creating a value which uniquely identifies the encrypted data (e.g., a watermark generated for the encrypted data). In a preferred aspect, a keyed-hash message authentication code (HMAC) may be used in a manner which would be understood by one having ordinary skill in the art. The hash functions may be any form hash, depending on the desired level of security which would be determinable by one having ordinary skill in the art. Exemplary hash functions include MD5, SHA 256, etc. In one approach, a hash function may be used without an HMAC, such as for a SHA3 hash function.

The storage system 352 may be any type of storage system known in the art. It should be understood by one having ordinary skill in the art that the storage system 352 may have more or less components than those listed herein.

In various aspects, the storage system 352 comprises a storage verifier 354. The storage verifier 354 obtains the outer watermark key 348 for the data to be written from the watermark key server 312. The storage verifier 354 verifies the outer watermark using the outer watermark key 348 in a manner which would become apparent to one having ordinary skill in the art upon reading the present disclosure. If the verification is successful, the data is written to the storage 356 in operation 358.

According to an exemplary operation of FIG. 3, data written by owner 302 is retrieved from the storage system 352 for processing by a target user 360. Outer encrypted data (e.g., doubly encrypted data) and the associated watermark(s) and/or watermark token(s) may be read via the secure transcoder 362 from the storage system 352 and transferred in operation 364 to an outer authencrypt verifier 366 located in the secure transcoder 362. The secure transcoder 362 obtains the outer watermark token key 346 from the key server 310 and the outer watermark key 348 from the watermark key server 312. The outer authencrypt verifier 366 verifies both the outer watermark and the outer watermark token, in a manner which would become apparent to one having ordinary skill in the art upon reading the present disclosure. If both the outer watermark and the outer watermark token are verified correctly, the outer encrypted data is transferred in operation 368 to the outer decrypter 370. The outer decrypter 370 obtains the outer encryption key 340 from the key server 310. The outer decrypter 370 decrypts the outer encrypted data using the outer encryption key 340 to generate the inner encrypted data. The inner encrypted data is transferred in operation 372 to the inner authencrypt verifier 374. The inner authencrypt verifier 374 obtains the inner watermark key 334 from the watermark key server 312 and uses the inner watermark key 334 to verify the inner watermark. If the inner watermark is verified successfully, the inner encrypted data is transferred in operation 376 to the secure transcoder outer encrypter 378. The secure transcoder outer encrypter 378 obtains an outer sharing key 380 from the key server 310 and uses the outer sharing key 380 to encrypt the inner encrypted data to generate new outer encrypted data. The new outer encrypted data (e.g., third encrypted data) is transferred in operation 381 to the secure transcoder watermark generator 382. The secure transcoder watermark generator 382 obtains watermark token key 384 from the key server 310 and the watermark key 383 from the watermark key server 312. The secure transcoder watermark generator 382 generates a new watermark token and a new watermark on the new outer encrypted data for sharing. The outer encrypted data for sharing and the associated inner and outer watermark tokens and watermarks are transferred in operation 385 to the target user's 360 double authencrypt engine 386.

Encrypted data received by the target user's 360 double authencrypt engine 386 is passed to the outer verifier 387. The outer verifier 387 obtains the watermark key 383 from the watermark key server 312 and the watermark token key 384 from the key server 310. The outer verifier 387 verifies the outer watermarks and watermark tokens in a manner which would become apparent to one having ordinary skill in the art upon reading the present disclosure. If the verification is successful, the outer encrypted data is transferred in operation 388 to the outer decrypter 389. The outer decrypter 389 obtains the outer sharing key 380 from the key server 310 and decrypts the outer encrypted data to generate inner encrypted data. The inner encrypted data is transferred in operation 390 to the inner verifier 391. The inner verifier 391 obtains the inner watermark token key 332 from the key server 310 and the inner watermark key 334 from the watermark key server 312. The inner verifier 391 verifies the watermark and the watermark token on the inner encrypted data, in a manner which would become apparent to one having ordinary skill in the art upon reading the present disclosure. If the verification is successful, inner encrypted data is transferred in operation 392 to the inner decrypter 393. The inner decrypter 393 obtains the inner encryption key 326 from the key server 310. The inner decrypter 393 uses the inner encryption key 326 to decrypt the inner encrypted data to plain text data. If the decryption is successful, the data (e.g., plaint text data) is transferred in operation 394 to the target user's 360 authorized application 395 for processing. Association of the appropriate keys for specific data written or read is managed by the owner's 302 manager 308 during data write by the owner 302. Association of the appropriate keys for specific data written or read is further managed by the target user's 360 manager 396 during data read by the target user 360.

In various aspects, the owner 302 may reference existing data in a manner which would become apparent to one having ordinary skill in the art upon reading the present disclosure. "Data" as discussed throughout the present disclosure may refer to a file, an object, a data block, a range of data blocks, etc., or any combination thereof. "Existing data" may refer to any file, object, data block, range(s) of blocks, etc., or any combination thereof which is stored and accessed with various of the policies described herein applied thereto. For example, the owner 302 may indicate to the manager 308 whether the authorized application 304 is creating new data and/or referencing existing data (e.g., data stored according to at least of the aspects in described in detail above). In another approach, the owner 302 may supply data indicating whether the owner 302 and/or the authorized application 304 request read only or read/write access to the existing data. If the authorized application 304 is not executing under owner credentials, the authorized application 304 may have access to the data as determined by policy set by the owner 302. In at least some aspects, when the owner 302 of the encryption keys reads stored data, the stored data does not go through the secure transcoder 362 and the owner 302 (e.g., the double authencrypt engine 306 on the owner's side) may verify watermark(s) and/or watermark token(s) in a manner which would become apparent to one having ordinary skill in the art upon reading the present disclosure.

In various approaches, the following definitions and operations may be applicable for performing the write operation described herein and as shown in FIG. 3:

Definitions pi=input plaintext i
ci=output ciphertext for pi
cci=output ciphertext for ci
sci=shared output ciphertext for ci
twi=inner watermark token for ci
txi=outer watermark token for cci
tvi=shared outer watermark token for sci
kp, kr, ko=inner, outer, shared data keys, respectively (e.g., encryption keys from key server)
h1, h2, j1=inner, outer, shared watermark token keys, respectively
w1, w2, v1=inner, outer, shared watermark keys, respectively (e.g., from the watermark key server)
wi, xi, vi=inner, outer, shared watermarks, respectively It should be noted that incremental numbering (e.g., such as ko1, ko2, etc.) is used to designate multiples of a component (e.g., as shown in FIGS. 3-6). For example, ko1 and ko2 may both refer to encryption keys, but distinct numbering represents different encryption keys, unless otherwise noted, as would become apparent one having ordinary skill in the art upon reading the present disclosure.

Generation of double authencrypt data at the source:
get kp, kr, h1, h2 from key server
get w1, w2 from watermark (ws) server
ci=encrypt(kp, pi)
twi=HMAC(h1, ci)
wi=HMAC(w1, ci‖twi)
cci=encrypt(kr, ci)
txi=HMAC(h2, cci)
xi=HMAC(w2, cci‖txi)
send to storage: {cci, twi, wi, txi, xi}
Verification of double authencrypt data at storage:
Get w2 from ws server
xi'=HMAC(w2, cci‖txi)
verify xi==xi'
store data if verified
Trusted transcode on read from storage for destination:
Read the data:
Get kr, h2 from key server
read(cci, twi, wi, txi, xi) from storage
get w2 from ws server
xi'=HMAC(w2, cci‖txi)
verify xi==xi'
txi'=HMAC(h2, cci)
verify txi==txi'
ci=decrypt(kr, cci)
get w1 from ws server
wi'=HMAC(w1, ci‖twi)
verify wi==wi'
Transcode (outer encryption to new key) and create shared watermark:
Get v1 from ws server
Get ko, j1 from key server
sci=encrypt(ko, ci)
tvi=HMAC(j1, sci)
vi=HMAC(v1, sci‖tvi)
send to dest: {sci, twi, wi, tvi, vi}
At destination (verification of inner and outer encryptions):
Read {sci, twi, wi, tvi, vi} from transcoder
get kp, ko, h1, j1 from key server
get w1, v1 from ws server
vi'=HMAC(v1, sci‖tvi)
verify vi==vi'
tvi'=HMAC(j1, sci)
verify tvi==tvi'
ci=decrypt(ko, sci)
wi'=HMAC(w1, ci‖twi)
verify wi==wi'
twi'=HMAC(h1, ci)
verify twi==twi'
pi=decrypt(kp, ci)

The watermark token keys may be stored and obtained from a key server and other watermark keys may be stored and obtained from a separate watermark key server (e.g., watermark key server), in at least some approaches. Other arrangements for obtaining different keys from the same or different key servers may be implemented in a manner which would become apparent to one having ordinary skill in the art upon reading the present disclosure.

In various aspects including dual watermarks and watermark tokens, the source owner and the destination of the data can fully verify all watermarks and watermark tokens to verify that both the inner encryption and the outer encryption were performed by authencrypt engines using authorized keys. Transcoders may verify all watermarks and watermark tokens except the inner watermark token. Transcoders are not able to generate a false inner watermark token that would allow the transcoder to do certain data substitution attacks. The storage may verify the outer watermark but not the inner watermark. Storage cannot falsify either or the inner encryption or the outer encryption watermark token. In the preferred environment, storage does not have access to the outer encryption key or outer watermark token key.

In some approaches, other types of watermarks may include hashing the encrypted data and encrypting the hash with the watermark key, hashing the encrypted data with the watermark key, etc. Asymmetric encryption techniques may be used, including PKI signatures, where a hash of encrypted data is then encrypted in a private key. The public key may be used to verify the signature, as would become apparent to one having ordinary skill in the art upon reading the present disclosure.

One having ordinary skill in the art may modify the various operations described herein for achieving a desired level of security based on the design requirements and the selection of operations used to create the watermark, in a manner which would become apparent upon reading the present disclosure. The watermark provides the ability to check the validity of the encryption without knowing the encryption key. The watermark token provides the ability to detect alterations to the watermark and/or the encrypted data while providing resistance to forgery. Performing these operations using symmetric encryption is often preferred due to the higher performance achievable, resistance to quantum attack, smaller key sizes, etc.

In various aspects of the present disclosure, verifiers may compare the computed watermark with the watermark which was received with the encrypted data (and, similarly, computed watermark tokens with the watermark tokens received). If the watermarks do not match, the encrypted data is not stored. In some approaches, the watermarks must match to a predefined extent. For example, in some approaches, the watermarks must be identical to be considered a "match." In other approaches, a predefined portion, percentage, sub-component, etc., of the watermarks must match. In response to determining that the watermarks do not match, a notification may be logged and/or an alert sent to an administrator indicating that an attempt has been made to store unauthorized data, in at least some aspects. The verification may be performed without the verifier having access to the plain text of the key used to create the ciphertext (e.g., the encrypted data). In one approach, if the watermark is generated as an encrypted hash (e.g., as a PKI signature), the detection operation of the verifier includes decrypting the watermark using the watermark key and comparing the decrypted watermark with a hash computed on the encrypted data, in a manner which would become apparent to one having ordinary skill in the art upon reading the present disclosure. The verifier may verify that the data is encrypted with authencrypt and not modified at any time, such as on read, during scrub operations (e.g., for checking data integrity), etc.

Detecting that the input data is encrypted may be performed in a manner known in the art. For example, the data from an authorized application may have a format and/or characteristic which can be determined from the unencrypted data but is missing from the encrypted data. Other techniques for detecting that the input data is encrypted include entropy measurement, statistical tests which are used to assign a probability of a piece of data being encrypted, etc. The system may use a plurality of data chunks, blocks, etc., to increase the accuracy of the detection probability. If the storage system supports continuous data protection, snapshots, or other means to provisionally store data (e.g., supports roll back), the detection may occur after a predetermined number of data pieces have been processed. Events such as snapshots may be triggered by a high probability of encrypted input being detected.

In at least some aspects, the encryption keys, the watermark keys, the watermark token keys, sharing keys, etc., may be stored in key servers. The key servers may be distributed key servers for additional resiliency. Each set of keys, sharing keys, the watermark token keys, and/or the watermark keys may be stored in a unique key server. In another approach, a single key server may serve any combination of keys. In a preferred aspect, for resiliency and fault tolerance, each set of keys k may be split between m servers such that k<m servers are required to obtain a key in a manner known to those skilled in the art. The keys, sharing keys, the watermark token keys, and/or the watermark keys may be stored in any other manner known in the art. For example, the keys, sharing keys, the watermark token keys, and/or the watermark keys may be stored in separate storage devices or the same storage device, the keys, the sharing keys, the watermark token keys, and/or the watermark keys may be generated and/or managed by key managers of a type known in the art. The keys, the sharing keys, the watermark token keys, and/or the watermark keys may be stored in the host system, the storage system, or any combination thereof, etc. As shown in FIG. 3, the keys and the watermark keys are separately stored to provide isolation. Container-like systems, or TEEs, may be used for isolating the keys, the sharing keys, the watermark token keys, and/or the watermark keys from system administrators, other users without root privileges, etc.

At least one exemplary implementation of secure data movement as provided herein uses inner-only watermark generation wherein the storage cannot access the inner encrypted data and thereby, cannot perform the watermark verification as previously described herein. For inner-only watermarking, all writes to storage are made through the secure transcoder (e.g., there can be no physical path to write to storage that does not go through the secure transcoder), which will perform the watermark verification. The transcoder verifies the watermark on write (e.g., the transcoder has access to the watermark key).

Because the storage cannot access the inner encrypted data, the storage system cannot generate a fake inner watermark. This reduces the requirement for a watermark token. However, if the watermark token includes either a logical block address (LBA), or sequence number to protect against other attacks (e.g., old data and/or substitute data from another LBA), then the watermark token also provides protection against an attack by the transcoder. In preferred aspects, the LBA and/or a sequence number is used to generate the watermark token and/or to verify the watermark token. Even if the LBA and/or sequence number is used to generate the watermark token, in various preferred aspects, a watermark token is used to reduce the level of trust required of the transcoder.

In one aspect of inner-only watermarking, the transcoder does not transcode the watermark. The transcoder only has access to the watermark key, to verify on write, but does not have access to the watermark token key. The destination verifies the watermark and has access to the watermark key. The destination verifies the watermark token and has access to the watermark token key.

In an alternative aspect of inner-only watermarking, the transcoder transcodes the watermark. The transcoder checks the watermark on read from storage and has access to the watermark key. The transcoder generates a new watermark with a new watermark key shared with the destination. The transcoder may verify the watermark token, in at least some approaches, where the transcoder has access to the watermark token key and any additional data such as the LBA (e.g., naturally known) and/or the sequence number. This aspect requires additional trust of the transcoder. The transcoder may generate a new watermark token using a new watermark token key to be shared with the destination (e.g., to verify the watermark token).

In yet another alternative aspect of inner-only watermarking, the transcoder may not verify the watermark token, in which case the watermark token key and ancillary information are shared with the destination for watermark token verification.

In various approaches, the following operations, using the definitions described in detail above, may be applicable for performing a read from storage for sharing with a destination in which both the watermark token and the watermark are transcoded by the transcoder.

For inner only watermarking, the source performs the following operations:
get kp, kr from key server
get h1, w1 from ws server
ci=encrypt(kp, pi)
twi=HMAC(h1, ci)
wi=HMAC(w1, ci∥twi)
cci=encrypt(kr, ci)
send to secure transcoder: {cci, twi, wi}

After the authorized encryption is completed, the data is encrypted with a second key (kr) to produce outer encrypted data, prior to being sent to storage through the secure transcoder. The secure transcoder decrypts the outer encrypted data to enable verification of the watermark on the inner encrypted data, before sending the outer encrypted data and watermarks to storage described below:
get kr from key server
read(cci, twi, wi) from source
ci=decrypt(kr, cci)
get w1 from ws server
wi'=HMAC(w1, ci∥twi)
verify wi==wi'

If the verification passes then the block (cci, twi, wi) is written to storage. If the verification does not pass, then there is a problem with the block, and the block should not be written.

The secure transcoder may also have a manager located therein that is used to manage the connections to destinations. When an authorized application authorizes an application on a destination system to have access to data, the authorized application informs the manager (e.g., associated with both authorized encryption and secure data transfer). The manager informs the key server and the watermark key server with access permission from the remote application. The manager's capabilities enable the secure transcoder to grant the outer key such that the remote application may read the data and authorize the key server to grant the transcode key and the inner key to authencrypt engine on the remote system.

On read from storage for transfer to a destination, the secure transcoder performs the following operations:
    Read the data:
    get kr from key server
    read(cci, twi, wi) from storage
    ci=decrypt(kr, cci)
    Verify the inner encrypted data
    get w1 from ws server
    wi'=HMAC(w1, ci||twi)
    verify wi==wi'
    get h1 from ws server
    twi'=HMAC(h1, ci)
    verify twi==twi'
    Create new shared watermark:
    get v1 from ws server
    get ko, j1 from key server
    tvi=HMAC(j1, ci)
    vi=HMAC(v1, ci||tvi)
    sci=encrypt(ko, ci)
    send to dest: {sci, tvi, vi}

At the destination, to get the plaintext from computation, the destination authencrypt engine performs the following operations:
    Decrypt the outer block:
    read {sci, tvi, vi} from transcoder
    get ko from key server
    ci=decrypt(ko, sci)
    Verify the watermarks:
    get v1 from ws server
    vi'=HMAC(v1, ci||tvi)
    verify vi==vi'
    get j1 from ws server
    tvi'=HMAC(j1, ci)
    verify tvi==tvi'
    Get access to the plaintext:
    get kp from key server
    pi=decrypt(kp, ci)

Another exemplary aspect of authorized secure data movement includes outer-only watermarking where the watermark token and the watermark are created based on the second (e.g., outer) encrypted data. For outer-only watermarking, if the watermark key is shared with storage, the storage checks the watermark on a write direct from the source. The watermark can be faked by storage, so the watermark token is checked on read from storage. The transcoder transcodes the watermark on transcoding the outer encrypted data. The original watermark will not match the transcoded, outer encrypted data.

To transcode the watermark, the transcoder verifies the watermark on the original outer encrypted data. The transcoder preferably has access to the watermark key. The watermark token is also verified by the transcoder where the transcoder also has access to the watermark token key. The transcoder uses the new watermark token and watermark keys to generate the watermark token and watermark on the new outer encrypted data. The outer encrypted data, watermark token, and watermark are transferred to the destination. The destination is preferably authorized to access both the watermark token and watermark keys. The destination verifies both the watermark and the watermark token. The transcoder preferably comprises a double authencrypt engine.

In the foregoing aspect, the transcoder is trusted with outer encryption keys, but not trusted with inner encryption keys. The transcoder is fully trusted with the watermark keys and watermark token keys. The destination is trusted with watermark keys (e.g., in the same manner that the destination is trusted with outer encryption keys). The destination verifies both the watermark and the watermark token.

Outer-only watermarking cannot verify that the inner encryption is authorized on write back from a destination. The destination may re-encrypt with a fake inner key and generate a valid watermark with the outer key. In this case, a ransomware attack may occur at the destination where only the outer watermark is used. The transcoder must be trusted to not circumvent authencrypt on the inner encrypted data, in a similar manner that trust in the storage would be required if there were no watermarks or if watermark tokens were not used.

The following operations illustrate an exemplary implementation of outer-only watermarking:
    At source:
    get kp, kr, h1 from key server
    ci=encrypt(kp, pi)
    cci=encrypt(kr, ci)
    get w1 from watermark key server
    txi=HMAC(h1, cci)
    xi=HMAC(w1, cci||txi)
    send to storage: {cci, txi, xi}
    On read from storage, at trusted transcoder:
    Read the data:
    get kr, h1 from key sever
    read (cci, txi, xi) from storage
    get w1 from ws server
    xi'=HMAC(w1, cci||txi)
    verify xi==xi'
    txi'=HMAC(h1, cci)
    verify txi==txi'
    ci=decrypt(kr, cci)
    Create shared watermark:
    get ko, j1 from key server
    get v1 from ws server
    sci=encrypt(ko, ci)
    tvi=HMAC(j1, sci)
    vi=HMAC(v1, sci||tvi)
    send to destination: {sci, tvi, vi}
    At destination:
    read {sci, tvi, vi} from transcoder
    get kp, ko, j1 from key server
    get v1 from ws server
    vi'=HMAC(v1, sci||tvi)
    verify vi==vi'
    tvi'=HMAC(j1, sci)
    verify tvi==tvi'
    ci=decrypt(ko, sci)
    pi=decrypt(kp, ci)

One exemplary implementation of authorized secure data movement includes a hybrid inner/outer watermarking approach. In the inner/outer watermarking approach, the watermark token is formed based on the inner (e.g., first) encrypted data. The watermark is created based on the watermark token and the outer (e.g., second) encrypted data.

The storage verifies the watermark based on access to the watermark, the watermark token, the outer encrypted data, and the watermark key. Therefore, the data is safely written directly from the source to the storage. Storage does not need to be trusted with encryption keys and does not need to trust the source of data. Storage only needs trusted, authorized access to the watermark keys. On retrieval from storage, the original source verifies the watermark token to prove that the data was not tampered with by the storage.

The transcoder transcodes the outer watermark, as it is based on the inner watermark token and on the outer encryption which is changed by the transcoder. Because the transcoder transcodes the watermark, the transcoder verifies the watermark before both transcoding the outer encryption and generating a new watermark. The transcoder preferably has access to the watermark key and the watermark token. The transcoder behavior performs according to at least two approaches.

In one of the exemplary approaches, the transcoder does not transcode the watermark token. The transcoder verifies the watermark token on read from storage. The storage may substitute bad data and generate a valid outer watermark. The transcoder has access to the watermark token key. If the transcoder does not verify the watermark token, detection of possible corruption by storage is delayed to the point of watermark token verification at the destination. The transcoded watermark is shared with the destination. The watermark token key is shared with the destination. This approach imposes additional trust of the transcoder to not substitute bad inner encrypted data.

In another exemplary approach, the transcoder transcodes the watermark token. The watermark token is used to prevent the storage from generating a valid watermark. The storage has access to the watermark token and watermark key. The storage does not have access to the watermark token key. If the storage generates a new (e.g., false) watermark, the false watermark is detected by a transcoder and/or the source because the watermark generated by the source is based on the encrypted data and a watermark token key, in preferred aspects, and will not match the false watermark generated at the storage. The transcoder preferably has access to the watermark token key. The transcoder may generate a new watermark token (e.g., transcodes the watermark) using a new watermark token key and share the new watermark token with the destination. Accordingly, when data is read by a destination, the transcoder verifies both the outer watermark and inner watermark token to ensure both are valid. The destination may verify both the watermark and the watermark token.

Detailed exemplary operations of hybrid watermarking where the transcoder does not transcode the watermark token (e.g., which assume additional trust of the transcoder) are presented below:

At source:
get kp, kr, h1 from key server
get w1 from ws server
ci=encrypt(kp, pi)
twi=HMAC(h1, ci)
cci=encrypt(kr, ci)
xi=HMAC(w1, cci||twi)
send to storage: {cci, twi, xi}

Trusted transcode:
Read the data:
Get kr, h1 from key server
read (cci, twi, xi) from storage
get w1 from ws server
xi'=HMAC(w1, cci||twi)
verify xi==xi'
ci=decrypt(kr, cci)
twi'=HMAC(h1, ci)
verify twi==twi'
Create shared watermark:
get ko from key server
get v1 from ws server
sci=encrypt(ko, ci)
vi=HMAC(v1, sci||twi)
send to destination: {sci, twi, vi}
At destination:
Read {sci, twi, vi} from transcoder
get kp, ko, h1 from key servers
get v1 from ws server
vi'=HMAC(v1, sci||twi)
verify vi==vi'
ci=decrypt(ko, sci)
twi'=HMAC(h1, ci)
verify twi==twi'
pi=decrypt(kp, ci)

Returning to the discussion of the preferred aspect of double authencrypt, the double authencrypt engine generates watermark tokens and watermarks on both inner encrypted data and outer encrypted data. Storage is authorized for access to only the outer watermark key. The secure transcoder has access to the inner watermark key, the outer watermark token key, and the outer watermark key. The sources and the destinations have access to all the watermark keys for the encrypted data. Storage verifies the outer watermark before writing data to storage. The transcoder verifies the outer watermark key, the outer watermark, and the inner watermark (but not the inner watermark token) before transcoding. The transcoder does not have access to the inner watermark token key. Access to the inner watermark token key would enable the transcoder to substitute alternate data for the inner encrypted data and generate valid watermark token.

Figure 4:
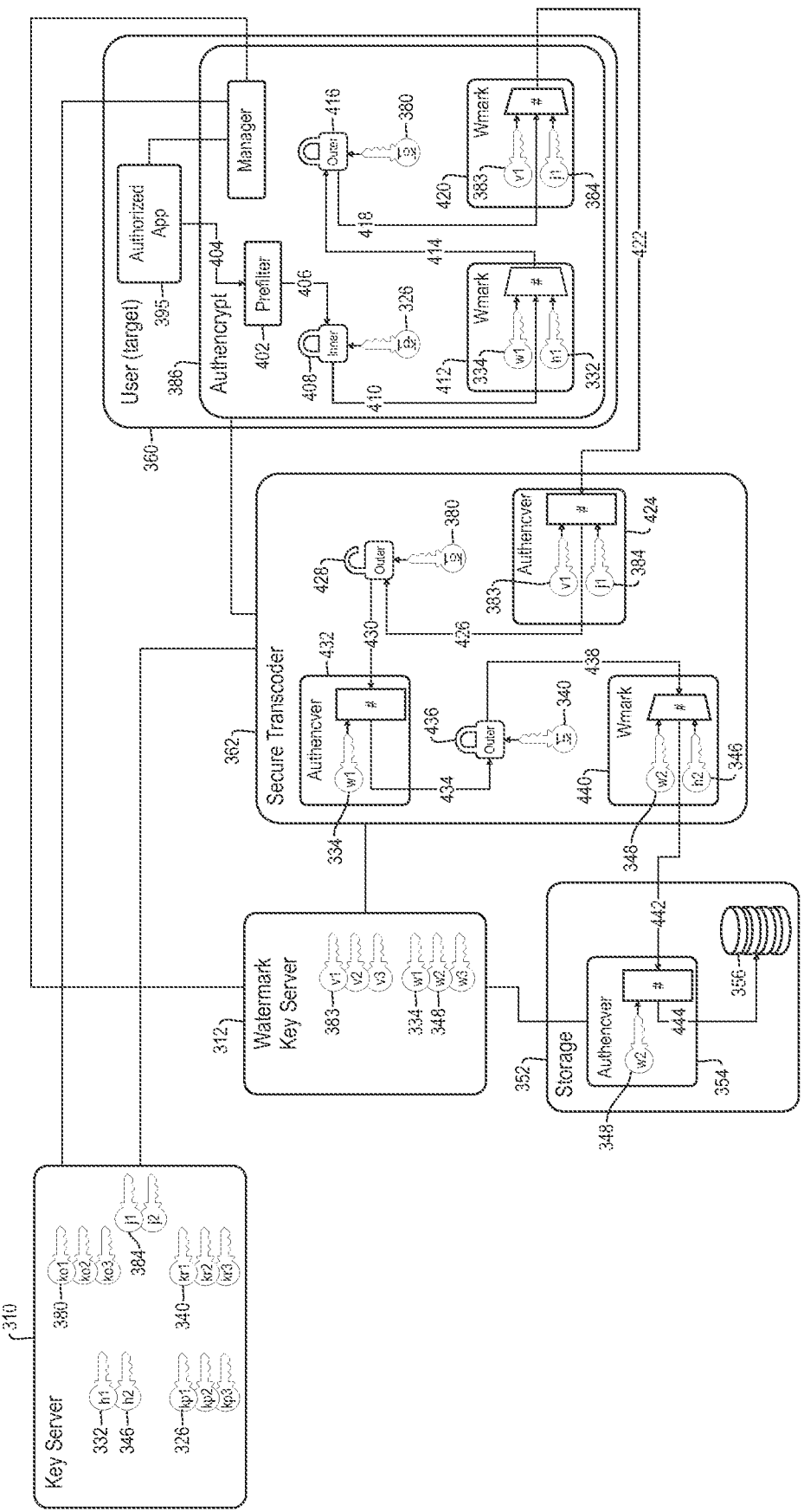
FIG. 4 is a diagram of a high level architecture, in accordance with one aspect of the present invention.

Data from the non-owner (destination) is preferably doubly encrypted according to at least some of the aspects described in detail above. FIG. 4 illustrates the data flow of a destination within the authencrypt trust zone performing a write-back of data to shared storage dual inner and outer watermarks.

FIG. 4 is a diagram of a high-level architecture, in accordance with various configurations. The architecture 400 may be implemented in accordance with the present invention in any of the environments depicted in FIGS. 1-3 and 5-11, among others, in various configurations. Of course, more or less elements than those specifically described in FIG. 4 may be included in architecture 400, as would be understood by one of skill in the art upon reading the present descriptions.

Architecture 400 illustrates an exemplary data system, according to one aspect. FIG. 4 shares common components with FIG. 3 and it should be understood by one having ordinary skill in the art that common features have common numbering and functionality.

The target user 360 inside the authencrypt zone uses the double authencrypt engine 386 on data being written back to storage in an analogous manner to data written to storage from the original owner (see exemplary FIG. 3). In an exemplary aspect, the authorized application 395 passes the data to the prefilter 402 in operation 404. The prefilter 402 determines that the data is not encrypted in a similar manner as described above. If the data is not encrypted, the data is sent in operation 406 to the inner encrypter 408 which encrypts the data with the inner encryption key 326 to generate inner encrypted data. The inner encrypted data is sent in operation 410 to an inner watermark generator 412. The inner watermark generator 412 receives the inner watermark key 334 from the watermark key server 312 and the inner watermark token key 332 from the key server 310. The inner watermark generator 412 generates an inner watermark and an inner watermark token according to at least some of the aspects described herein. The inner encrypted data, the inner watermark, and the inner watermark token are sent in operation 414 to the outer encrypter 416 which uses the outer sharing key 380 to generate outer encrypted data. The outer encrypted data, the inner watermark, and the inner watermark token are sent in operation 418 to the outer watermark generator 420. The outer watermark generator 420 receives the watermark key 383 from the watermark key server 312 and the watermark token key 384 from the key server 310. The outer watermark generator 420 generates an outer watermark and an outer watermark token for the outer encrypted data according to at least some of the aspects described herein.

The outer encrypted data, the inner watermarks, and the outer watermarks are transferred in operation 422 to the secure transcoder 362. The secure transcoder 362 outer verifier 424 verifies the outer watermark using the watermark token key 384 obtained from the watermark key server 312 and the watermark token key 384 from the key server 310. If the verification is successful, the outer encrypted data is sent in operation 426 for decryption by the outer decrypter 428 using the outer sharing key 380 obtained from the key server 310. The decrypted data (e.g., the inner encrypted data) is sent in operation 430 to the inner verifier 432. The inner verifier 432 obtains the inner watermark key 334 from the watermark key server 312 and verifies the watermark. If the verification is successful, the inner encrypted data is transferred in operation 434 to the outer encrypter 436. The outer encrypter 436 encrypts the inner encrypted data using the outer encryption key 340 obtained from the key server 310 to generate outer encrypted data. The outer encrypted data is sent in operation 438 to the outer watermark generator 440. The outer watermark generator 440 obtains the outer watermark token key 346 from the key server 310 and the outer watermark key 348 from the watermark key server 312. The outer watermark generator 440 generates a new outer watermark token and a new outer watermark. The inner and outer watermark tokens, the inner and outer watermarks, and the outer encrypted data are transferred in operation 442 to the storage verifier 354 in the storage system 352. The storage verifier 354 obtains the outer watermark key 348 from the watermark key server 312 and verifies the outer watermark. If the verification is successful, then the encrypted data, watermark tokens, and watermarks are written in operation 444 to storage 356.

If the destination is not within the authencrypt trust zone, additional verification is required. If the data is watermarked and watermark keys are shared with the transcoder, then the transcoder first verifies all watermarks and watermark tokens. Fully decrypted data is verified to be unencrypted plain text, as there is no assurance that a prefilter operation was properly applied prior to encryption outside of the authencrypt trust zone.

In preferred aspects of data exchange with nodes outside of the authencrypt trust zone, a trusted verifier (e.g., a secure verifier) assists the secure transcoder when transcoding double encrypted data for exchange with a node outside of the authencrypt trust zone. The trusted verifier comprises four elements: a watermark token identifier, a data decrypter, a prefilter that determines if data is encrypted, and a watermark token generator. The trusted verifier has access to inner encryption keys and inner watermark token keys. The trusted verifier receives inner encrypted data for verification. The trusted verifier outputs the verification result and newly generated inner watermark tokens, in at least some aspects. The trusted verifier does not export encrypted or plain text data. The trusted verifier may be executed in a secure enclave or other protected environment to ensure that unencrypted data is not leaked to other elements of the system.

In exchanging data with nodes outside of the authencrypt trust zone, the trust zone's watermark keys cannot be shared with external nodes. Therefore, the watermarks are regenerated in a different set of watermark keys that are shared with the external node. The transcoder verifies and regenerates watermarks for outer encrypted data during a transcode operation. The transcoder has access to the inner encrypted watermark key. By providing the transcoder with the shared outer watermark keys and the shared inner watermark key, the transcoder may verify and regenerate outer watermark tokens, outer watermarks, and inner watermarks, when transcoding data going to or coming from an external source. The transcoder does not have access to the inner watermark token key or the inner encryption key, in preferred aspects. The transcoder cannot fully verify externally sourced data as not being encrypted outside of known keys and cannot verify inner watermark tokens.

In exchanging data with nodes outside of the authencrypt trust zone, the transcoder passes the inner encrypted data to a secure verifier for verification and inner watermark token regeneration. The secure verifier is trusted with both inner encryption keys and inner watermark token keys (e.g., both the authencrypt trust zone watermark token keys and externally shared watermark token keys). On exchange with a node external to the authencrypt trust zone, the secure verifier is passed inner encrypted data. The secure verifier verifies inner watermark tokens, decrypts the data and verifies that the plain text (e.g., the data just decrypted) is not encrypted when receiving data from an external source and generates a new watermark token. The secure verifier passes the verification confirmation and watermark token back to the transcoder. The transcoder halts transcoding and reports an error if the secure verifier does not report a successful verification. A secure verifier does not do encryption or pass encrypted data back to the transcoder, so that the secure verifier cannot corrupt or substitute false encrypted data.

On transcoding encrypted data for sending to nodes outside of the trust zone, the secure verifier verifies the inner watermark token using an inner watermark token key owned by the authencrypt trust zone and generates a new inner watermark token using the inner watermark token key shared with the external node. The secure verifier returns the verification results and new watermark token to the transcoder.

Figure 5:
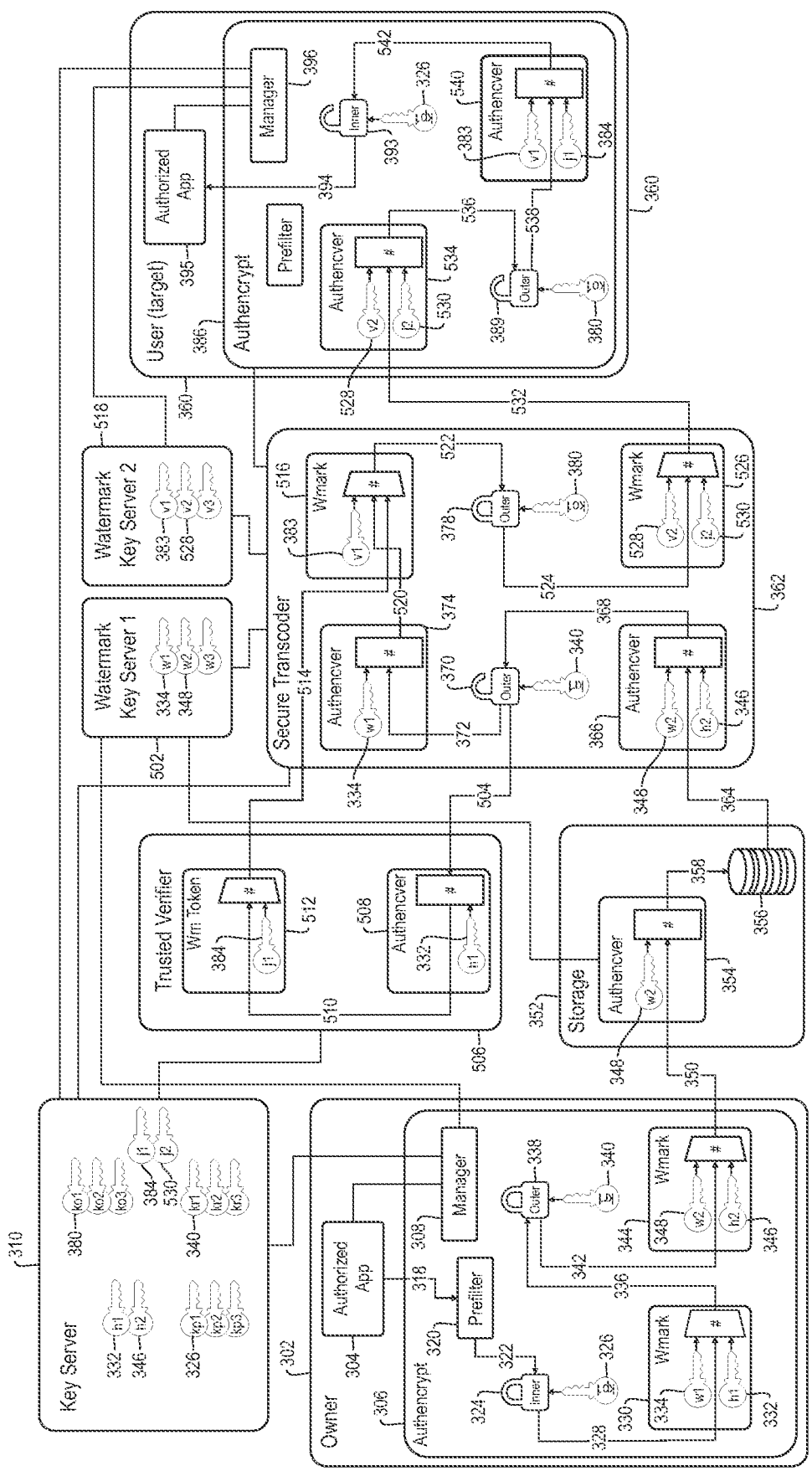
FIG. 5 is a diagram of a high level architecture, in accordance with one aspect of the present invention.

FIG. 5 is a diagram of a high-level architecture, in accordance with various configurations. The architecture 500 may be implemented in accordance with the present invention in any of the environments depicted in FIGS. 1-4 and 6-11, among others, in various configurations. Of course, more or less elements than those specifically described in FIG. 5 may be included in architecture 500, as would be understood by one of skill in the art upon reading the present descriptions.

Architecture 500 illustrates an exemplary data system, according to one aspect. FIG. 5 shares common components with FIG. 3, and others, and it should be understood by one having ordinary skill in the art that common features have common numbering and functionality. An exemplary operation of a transcoder for sending data to a node outside of the authencrypt zone is illustrated in FIG. 5.

Outer encrypted data and watermarks are transferred in operation 364 from storage 356 to the outer authencrypt verifier 366 located in the secure transcoder 362. The outer authencrypt verifier 366 obtains the outer watermark key 348 from the first watermark key server 502 and the outer watermark token key 346 from the key server 310. If verified, the outer authencrypt verifier 366 sends the outer encrypted data and watermarks in operation 368 to the outer decrypter 370. The outer decrypter 370 decrypts the data using the outer encryption key 340 to generate inner encrypted data. Inner encrypted data and associated inner encryption watermarks are sent in operation 504 to the secure verifier 506. Inner encrypted data and the inner encryption watermark are also sent in operation 372 to the inner authencrypt verifier 374. The secure verifier 506 comprises a verifier 508 which verifies the inner watermark token. If the verification is successful, the verifier 508 sends the inner encrypted data in operation 510 to an inner watermark token generator 512. Alternatively, if the verification is unsuccessful, the verifier 508 sends an indication of the unsuccessful verification in operation 510 to an inner watermark token generator 512. The inner watermark token generator 512 obtains watermark token key 384 from the key server 310, generates a new watermark token, and transfers the new watermark token and a verification message in operation 514 to the inner watermark generator 516 located in the secure transcoder 362. The inner authencrypt verifier 374 obtains the inner watermark key 334 from the first watermark key server 502 and similarly verifiers the watermark. If verification by both the secure verifier 506 and the inner authencrypt verifier 374 are successful, the inner encrypted data is passed to the inner watermark generator 516 in operation 520. The inner watermark generator 516 generates a new inner watermark using the watermark key 383 obtained from the second watermark key server 518. In preferred aspects, in addition to the inner encrypted data and watermark key 383 as inputs, the inner watermark generator 516 uses the actual watermark token generated by the inner watermark token generator 512 in the secure verifier 506 to generate the new inner watermark. The inner encrypted data is passed in operation 522 to the secure transcoder outer encrypter 378. The secure transcoder outer encrypter 378 obtains the outer sharing key 380 from the key server 310 and encrypts the inner encrypted data to generate outer encrypted data. Outer encrypted data is passed in operation 524 to the outer watermark generator 526. The outer watermark generator 526 obtains shared outer watermark key 528 from the second watermark key server 518 and the outer watermark token key 530 from the key server 310. The outer watermark generator 526 generates a new outer watermark token and an outer watermark in a manner which would become apparent to one having ordinary skill in the art upon reading the present disclosure. The outer encrypted data, the inner watermark token, the inner watermark, the outer watermark token, and the outer watermark are transferred in operation 532 to the target user 360.

An outer verifier 534 at the target user 360 uses the shared outer watermark key 528 from the second watermark key server 518 and the outer watermark token key 530 from the key server 310 to verify the outer watermark. If the verification is successful, outer encrypted data, the inner watermark token, the inner watermark, the outer watermark token, and the outer watermark are transferred in operation 536 to the outer decrypter 389 which decrypts the outer encrypted data using the outer sharing key 380 from the key server 310 to generate inner encrypted data. The inner encrypted data is sent in operation 538 to the inner verifier 540 which uses the watermark key 383 obtained from the second watermark key server 518 and the watermark token key 384 obtained from the key server 310 to verify the inner watermark and the inner watermark token. If the verification is successful, the inner encrypted data is sent in operation 542 to the inner decrypter 393. The inner decrypter 393 obtains the inner encryption key 326 from the key server 310. The inner decrypter 393 uses the inner encryption key 326 to decrypt the inner encrypted data to plaintext. If the decryption is successful, the data (e.g., plain text data) is transferred in operation 394 to the target user's 360 authorized application 395 for processing.

In preferred aspects, the secure transcoder cannot decrypt the inner encrypted cipher text, as those keys are never shared with the transcoder. The transcoder verifies that the data has been properly encrypted by an authorized encryptor and not by malware first. This verification may be performed after decrypting the outer encrypted data and before transcoding to a new outer encrypted key. The inner encrypted data is passed to a trusted verifier, which has access to the inner encryption key but not the outer encryption key. The trusted verifier verifies the inner watermark token using the inner watermark token key shared with the external node. If verified, the trusted verifier decrypts the inner encrypted data and verifies that the fully decrypted data is not encrypted using an encryption detection prefilter function as described herein. The success or failure of the verification is then returned to the transcoder and the decrypted data is discarded. Because the inner encryption was not performed by an authencrypt engine inside the authencrypt trust zone, a new watermark token and a new watermark are generated on the inner encrypted data based on watermark token keys and watermark keys which are recognized and maintained by the authencrypt trust zone key servers. These keys are associated with the inner encryption key shared from the encrypted data source that is outside of the authencrypt trust zone, in preferred aspects. The trusted verifier obtains the inner watermark token key, generates the watermark token and passes the watermark token to the transcoder. The transcoder may obtain the new inner watermark key and generate the inner watermark based on the inner encrypted data and the inner watermark token.

Figure 6:
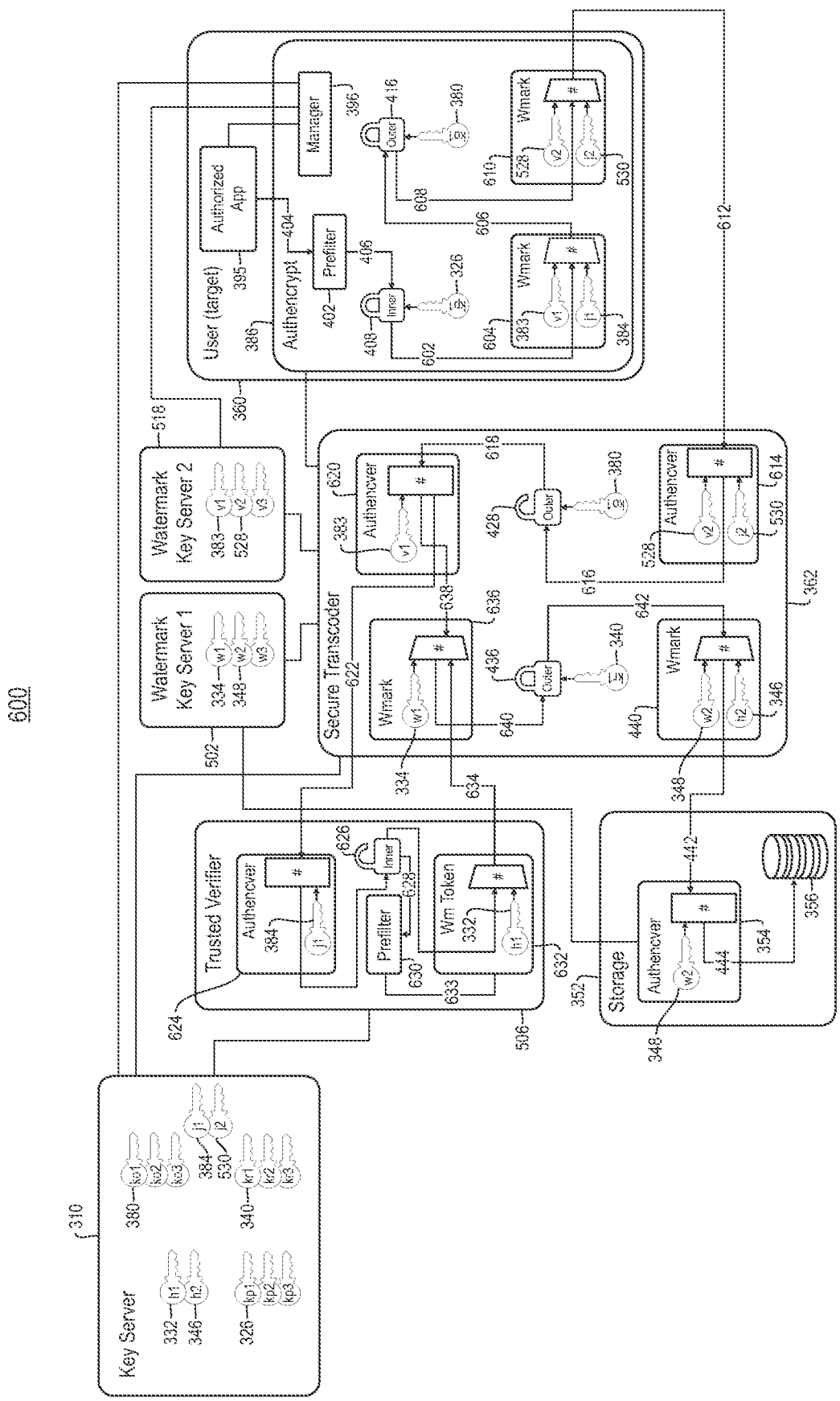
FIG. 6 is a diagram of a high level architecture, in accordance with one aspect of the present invention.

FIG. 6 is a diagram of a high-level architecture, in accordance with various configurations. The architecture 600 may be implemented in accordance with the present invention in any of the environments depicted in FIGS. 1-5 and 7-11, among others, in various configurations. Of course, more or less elements than those specifically described in FIG. 6 may be included in architecture 600, as would be understood by one of skill in the art upon reading the present descriptions.

Architecture 600 illustrates an exemplary data system, according to one aspect. FIG. 6 shares common components with FIG. 4, and others, and it should be understood by one having ordinary skill in the art that common features have common numbering and functionality. An exemplary operation of a write-back from a destination outside of the authencrypt trust zone using a trusted verifier is illustrated in FIG. 6.

Data being written back to storage by an authorized application 395 of a target user 360 is sent to the double authencrypt engine 386 in the trusted authencrypt zone of the target user 360, which is outside of the trusted authencrypt zone of the owner (not shown), the secure transcoder 362, and the storage system 352. In an exemplary aspect, the authorized application 395 passes the data to the prefilter 402 in operation 404. The prefilter 402 determines that the data is not encrypted in a similar manner as described above. If the data is not encrypted, the data is sent in operation 406 to the inner encrypter 408 which encrypts the data with the inner encryption key 326 to generate inner encrypted data. The inner encrypted data is sent in operation 602 to an inner watermark generator 604. The inner watermark generator 604 receives the watermark key 383 from the second watermark key server 518 and the watermark token key 384 from the key server 310. The inner watermark generator 604 generates an inner watermark and an inner watermark token according to at least some of the aspects described herein. The inner encrypted data, the inner watermark, and the inner watermark token are sent in operation 606 to the outer encrypter 416 which uses the outer sharing key 380 to generate outer encrypted data. The outer encrypted data, the inner watermark, and the inner watermark token are sent in operation 608 to the outer watermark generator 610. The outer watermark generator 610 receives the outer watermark key 528 from the second watermark key server 518 and the outer watermark token key 530 from the key server 310. In another approach, the outer watermark generator 610 receives the outer watermark token key 530 from the second watermark key server 518 or from another key server so as to maintain privacy of information associated with data recorded internally (e.g., in a preferred aspect, the target user 360 does not have access to the internal key server 310). The outer watermark generator 610 generates an outer watermark and an outer watermark token for the outer encrypted data according to at least some of the aspects described herein. The outer encrypted data, the inner watermarks, and the outer watermarks are transferred in operation 612 to the secure transcoder 362 inside the owner's authencrypt zone. In at least some approaches, if the destination does not support authencrypt, the watermarking steps are skipped.

The outer verifier 614 in the secure transcoder 362 obtains the shared outer watermark key 528 from the second watermark key server 518 and the outer watermark token key 530 from the key server 310 and verifies the outer encryption according to at least some of the approaches described herein. If the verification is successful, the outer encrypted data is passed in operation 616 to the outer decrypter 428 for decryption using the outer sharing key 380 obtained from the key server 310. The decrypted data (e.g., the inner encrypted data) is sent in operation 618 to the inner verifier 620. The inner verifier 620 obtains the watermark key 383 from the second watermark key server 518 and verifies the watermark. If the verification is successful, the inner encrypted data is transferred in operation 622 to the secure verifier 506. The secure verifier 506 includes verifier 624 which obtains the watermark token key 384 from the key server 310 and verifies the inner watermark token. If the verification is successful, the secure verifier 506 obtains inner encryption key 326 (not shown in the secure verifier 506) from key server 310. The inner decrypter 626 uses the inner encryption key 326 to decrypt the data. The decrypted data is passed in operation 628 to prefilter 630 to verify that the decrypted data is unencrypted. If the verification is successful, the prefilter 630 sends a verification message to the watermark generator 632 in the secure verifier 506 operation 633. The watermark generator 632 in the secure verifier 506 obtains the inner watermark token key 332 from the key server 310 and generates a new inner watermark token. The new inner watermark token and a verification message are passed back to the watermark generator 636 in the secure transcoder 362 in operation 634. If the verification was successful, the watermark generator 636 obtains the inner watermark key 334 from the first watermark key server 502 and uses the inner encrypted data passed in operation 638 from the inner verifier 620, the inner watermark token from operation 634, and the inner watermark key 334 to generate a new watermark. The inner encrypted data is passed in operation 640 to the outer encrypter 436. The outer encrypter 436 encrypts the inner encrypted data using the outer encryption key 340 obtained from the key server 310 to generate outer encrypted data. The outer encrypted data is sent in operation 642 to the outer watermark generator 440. The outer watermark generator 440 obtains the outer watermark token key 346 from the key server 310 and the outer watermark key 348 from the first watermark key server 502. The outer watermark generator 440 generates a new outer watermark token and a new outer watermark. The inner and outer watermark tokens, the inner and outer watermarks, and the outer encrypted data are transferred in operation 442 to the storage verifier 354 in the storage system 352. The storage verifier 354 obtains the outer watermark key 348 from the first watermark key server 502 and verifies the outer watermark. If the verification is successful, then the encrypted data and watermarks are written in operation 444 to storage 356.

In an alternative aspect, on receiving data from outside of the authencrypt trust zone, a first double authencrypt engine verifies and fully decrypts the data from the outside of the trust zone using keys shared from the external source. The unencrypted data is then encrypted and watermarked by a second double authencrypt engine using keys from the trusted authencrypt zone. This encryption process performs the unencrypted filter verification before encryption, such that the encrypted data at this point has been validated. Data imported in this manner does not require verification by a secure verifier attached to the transcoder.

Now referring to FIG. 7, a flowchart of a method 700 is shown according to one aspect. The method 700 may be performed in accordance with the present invention in any of the environments depicted in FIGS. 1-6 and 8-11, among others, in various aspects. Of course, more or fewer operations than those specifically described in FIG. 7 may be included in method 700, as would be understood by one of skill in the art upon reading the present descriptions.

Each of the steps of the method 700 may be performed by any suitable component of the operating environment. For example, in various aspects, the method 700 may be partially or entirely performed by computers, or some other device having one or more processors therein. The processor, e.g., processing circuit(s), chip(s), and/or module(s) implemented in hardware and/or software, and preferably having at least one hardware component may be utilized in any device to perform one or more steps of the method 700. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 7, method 700 includes operation 702. Operation 702 includes receiving second encrypted data, watermarks, and a first watermark token from data storage in response to a data request from a destination node outside of an authorized encryption zone. Second encrypted data, according to various aspects of the present disclosure, includes data which has been encrypted in a first key to create first encrypted data. The first encrypted data is preferably encrypted in a second key to create second encrypted data. The first watermark token is generated for the first encrypted data.

In various aspects, the second encrypted data is received at a secure transcoder, such as a secure transcoder described in various aspects of the present disclosure. The transcoder may be located on the source node, on the data storage, on a storage network coupled to the source node and the data storage, etc.

An authorized encryption trust zone (e.g., an authorized encryption zone) preferably comprises a source node which stores data to data storage using an authorized encryption layer, the data storage, the authorized encryption layer, a secure transcoder, and a trusted verifier. In a preferred aspect, an authenticated encryption layer (e.g., an authorized encryption layer) on a host system (e.g., source node) performs authentication of the applications which produce and/or process data to be stored. The authentication may be performed in a manner known in the art. In various approaches, an application must be authorized to perform encryption and/or store encrypted data in a storage system. A host system, a user, a system, etc., may determine whether an application or a plurality of applications are authorized, prior to the application requesting to read and/or write encrypted data from/to the storage system, in any manner known in the art. In preferred aspects, unencrypted data is not stored in the storage system.

In various aspects, in response to determining that the application is not authorized for encryption, the authenticated encryption layer blocks the read request, the write request, etc., from the unauthorized application. In some aspects, the system may log the incident and/or send an alert to a user of the system to indicate a possible attack from a bad actor. The data may comprise any data format known in the art. The data may be in the form of data files, chunks, blocks, etc., or any combination thereof. In various approaches, the data is received at the authenticated encryption layer in any manner known in the art. In preferred aspects, the data is only received in response to determining that the application sending the data is authorized.

In one approach, the authenticated encryption layer includes a prefilter function. In preferred aspects, the prefilter function performs an encryption detection function which includes determining whether the data is pre-encrypted. More specifically, the encryption detection function of the prefilter determines whether the data has been previously encrypted in any encryption key. In response to determining that the data is encrypted, the authenticated encryption layer may block the data from further processing (e.g., an error may be output, the data may be blocked from further encryption, the write and/or read request is denied, etc.). The error may be logged and/or an alert sent to a user, as described above. Specifically, in response to determining that the data is encrypted, the authenticated encryption layer blocks the encryption of the data. In one exemplary aspect, the authenticated encryption layer may block a write request for encrypted data even if the request is from an authorized application. The authenticated encryption layer preferably only encrypts unencrypted data for authorized applications.

The authenticated encryption layer may request an encryption key and/or a watermark key for the data. In at least some approaches, the encryption key and the watermark key are requested from separate key servers. For example, the encryption key may be requested from a key server and the watermark key may be requested from a watermark key server. In other aspects, the encryption key and the watermark key are requested from the same key server. The key server(s) may be located on the host system, encapsulated from the host system and/or the storage system, on the storage system, etc. In preferred aspects, the storage system does not have access to the encryption keys.

According to various aspects, the second encrypted data is generated by the authenticated encryption layer before the data is sent to storage. For example, creating the second encrypted data may include first encrypting the data (e.g., plain text data) using an encryption key (e.g., a first key). The first key may be used to encrypt the data in a manner known in the art to obtain first encrypted data. In preferred aspects, the first key is not available to the application. The first key may be requested by the authenticated encryption layer and sent directly to the authenticated encryption layer in response to the request, preferably bypassing the authorized application. The first encrypted data is encrypted with a second key to obtain second encrypted data in a similar manner, in various approaches.

In various approaches, the authenticated encryption layer may request various keys discussed herein based on the credentials of the authorized application. For example, each authorized application may be associated with a single encryption key and a single watermark key. In another example, each authorized application may be associated with set of encryption keys and a set of watermark keys. Any combination of applications, encryption keys, watermark keys, etc., may be used according to at least some of the aspects described throughout the present disclosure.

In preferred aspects, a watermark is generated for the first encrypted data using a watermark key associated with the first encrypted data (e.g., a first watermark key) and/or a watermark is generated for the second encrypted data using a watermark key associated with the second encrypted data (e.g., a second watermark key). A watermark generated for the first encrypted data may be interchangeably referred to as a first watermark. A watermark generated for the second encrypted data may be similarly interchangeably referred to as a second watermark. The watermarks received at the secure transcoder may include the first watermark and/or the second watermark.

In various aspects, the watermark of the encrypted data may be generated in any manner known in the art. In one approach, the watermark is a keyed-hash message authentication code using the watermark key and a watermark token, in a manner which would become apparent to one having ordinary skill in the art upon reading the present disclosure.

In preferred aspects, a watermark token is generated for the first encrypted data using a watermark token key associated with the first encrypted data (e.g., a first watermark token key) and/or a watermark token is generated for the second encrypted data using a watermark token key associated with the second encrypted data (e.g., a second watermark token key). A watermark token generated for the first encrypted data may be interchangeably referred to as a first watermark token. A watermark token generated for the second encrypted data may be similarly interchangeably referred to as a second watermark tokens. The watermark tokens received at the secure transcoder may include the first watermark token and/or the second watermark token.

According to various approaches, generating a watermark token may include any process of turning the encrypted data into a random string of characters (e.g., a token) that has no meaningful value if breached. Any token as referred to herein may serve as reference to the original data, but the token cannot be used to guess those values (e.g., access the data). In at least some approaches, the watermark token is a message authentication code (MAC) of the encrypted data. In various approaches, the authenticated encryption layer produces meta data associated with the watermark and/or the watermark key. In some approaches, an associated watermark and/or watermark key may be used to generate a watermark token. Similarly, a watermark token and/or watermark token key may be used to generate a watermark, in at least some approaches.

In at least one approach, a first and second watermark are generated and a first and second watermark token are generated. In another approach, only a first watermark and a first watermark token are generated. In yet another approach, only a second watermark and a second watermark token are generated. In yet a further approach, only a first watermark token and a second watermark are generated (e.g., according to hybrid approaches described herein). It would become apparent to one having ordinary skill in the art upon reading the present disclosure that any combination of first and/or second watermarks, first and/or second watermark tokens, and first and/or second watermark token keys may be used with the associated level of security which would be determinable by one having ordinary skill in the art.

In at least some aspects, prior to the secure transcoder receiving the second encrypted data and the watermarks, the authenticated encryption layer may store the second encrypted data and any generated watermarks to the data storage. In some approaches, the storage system may be a sub-system of a computer performing the method, e.g., such as a data storage drive that is part of, and/or is coupled directly to, the computer. The data storage may include a verifier function which has access to watermark keys in a key server. The data storage is preferably authorized to access the appropriate watermark keys in a manner known in the art according to various authorization policies described herein. In other approaches, meta data associated with the watermark and/or the watermark key is sent to the data storage. The data storage may request the associated watermark key from the key server based on the meta data, in a manner which would become apparent to one having ordinary skill in the art upon reading the present disclosure. The verifier function of the data storage may use any respective watermark key to verify the watermarks.

The verifier function of the data storage may also have access to watermark token keys in a key server (e.g., which may be the same key server which holds the watermark keys or a different key server). The data storage is preferably authorized to access the appropriate watermark token keys in a manner known in the art according to various authorization policies described herein. The verifier function of the data storage may use any respective watermark token key to verify the watermark tokens.

In one aspect, a second watermark is generated for the second encrypted data. The second encrypted data and the second watermark may be sent to the data storage and the data storage has access to the second watermark key. The verifier function in the data storage verifies the second watermark using the second watermark key as would be understood by one having ordinary skill in the art upon reading the present disclosure. Any watermark verification described herein may be deemed "successful" if the watermarks "match," according to at least some of the aspects described above.

In one approach of the foregoing aspect, a second watermark token is generated for the second encrypted data. The data storage may use the second watermark token key to verify the second watermark token as would be understood by one having ordinary skill in the art upon reading the present disclosure.

Operation 704 includes verifying the second watermark generated for the second encrypted data. According to method 700, the transcoder receives second encrypted data and a first watermark and a second watermark, as described above. The transcoder is preferably authorized to access the appropriate watermark keys in a manner known in the art according to various authorization policies described herein. In various aspects, the transcoder comprises a verifier function which may verify any of the first watermarks, second watermarks, etc., in a similar manner to the verifier function described with respect to the data storage.

Operation 706 includes decrypting the second encrypted data using the second key to obtain the first encrypted data. In preferred aspects, operation 704 is performed in response to successful verification of the second watermark in operation 702. The transcoder is preferably authorized to access the appropriate encryption keys (e.g., the first key, the second key, etc.) in a manner known in the art according to various authorization policies described herein.

Operation 708 includes verifying the first watermark generated for the first encrypted data. The first watermark generated for the first encrypted data may be verified using the first watermark key from a key server, as described above.

Operation 710 includes sending the first encrypted data to a trusted verifier upon successful verification of the first watermark. The trusted verifier may be of the type described in FIGS. 5-6 and throughout the present disclosure. A trusted verifier may be configured to perform at least some of the aspects of method 800. In various aspects, the trusted verifier is configured to verify the first watermark token generated for the first encrypted data where the trusted verifier has access to the first watermark token key in a similar manner as the data storage and/or the transcoder. The trusted verifier may send a verification message to the secure transcoder in response to successful verification of the first watermark token, which is received by the secure transcoder in operation 712. In other approaches, the trusted verifier is configured to verify a watermark and/or watermark token generated for the first encrypted data. The trusted verifier may be configured to send a verification of the watermark and/or the watermark token generated for the first encrypted data to a transcoder.

Operation 712 includes, in response to receiving verification of the first watermark token from the trusted verifier, encrypting the first encrypted data with a third key to create third encrypted data. In preferred approaches, the transcoder has access to the third key in the key server as described in operation 706 and the encryption is performed in a manner known in the art.

Operation 714 includes generating a third watermark and/or a third watermark token for the third encrypted data. The third watermark may be generated for the third encrypted data using a third watermark key according to various aspects described herein. The third watermark token may be generated for the third encrypted data using a third watermark token key according to various aspects described herein.

Operation 716 includes, sending the third encrypted data, the watermarks, and the watermark token(s), including the third watermark and/or the third watermark token, to an authorized destination. The third encrypted data, the watermarks, and the watermark token(s) may be sent to an authorized destination in a manner known in the art.

In an alternative aspect, only the second watermark is sent to the transcoder in operation 702. The first watermark may not be generated or may not be sent to the transcoder and/or data storage. The transcoder may read the second encrypted data and the second watermark and verify the second watermark using the second watermark key, as above. The transcoder may send the second encrypted data and the first watermark to a trusted verifier which is configured to verify the second watermark generated for the second encrypted data. Upon successful verification of the second watermark by the trusted verifier, the transcoder may write the second encrypted data and the first watermark to the data storage.

In other aspects, the transcoder also verifies the first watermark token and/or the second watermark token in a manner which would become apparent to one having ordinary skill in the art reading the present disclosure.

In various aspects, the transcoder sends the third encrypted data and any generated watermarks and/or watermark tokens to an authorized destination. The authorized destination preferably has access to the third key, the first key, the first watermark key, and the third watermark key according to policies set by a manager in the source node and/or other authorization procedures described herein. The authorized destination is configured to verify the third watermark using the third watermark key as described above with an analogous verifier function at the authorized destination. Upon successful verification of the third watermark, the authorized destination may decrypt the third encrypted data using the third key to obtain the first encrypted data. The authorized destination preferably verifies the first watermark using the first watermark key as would be understood by one having ordinary skill in the art upon reading the present disclosure. Upon successful verification of the first watermark, the authorized destination may decrypt the first encrypted data to obtain the data (e.g., the plain text data) using the first key. The authorized destination may use the data for processing according to any desired implementation.

In at least some aspects, the authorized destination also has access to a third watermark token key and the first watermark token key. The authorized destination may additionally verify each of the third watermark token and the first watermark token before accessing data in the clear, as would be understood by one having ordinary skill in the art upon reading the present disclosure.

In various aspects, in response to determining that any verification is unsuccessful, the storage of the encrypted data, any watermarks, any watermark tokens, etc., is blocked. In some aspects, blocking storage of the encrypted data, any watermarks, any watermark tokens, etc., may not prevent transient storage of the data pending the verification. For example, the data storage may receive and store the encrypted data in a cache temporarily, pending the verification, as would become apparent to one having ordinary skill in the art upon reading the present disclosure.

The data storage is preferably configured to verify the encrypted data for storage prior writing a block and/or after reading a block. A block that fails verification is not written to storage or, similarly, the read is not returned to the requestor. In various aspects, the data storage does its own independent calculation of the watermark using the encrypted data and the watermark key as part of the verification. If associated values of the encrypted data and/or the watermark token are not the values which were generated by an authenticated encryption layer, the verification fails.

Now referring to FIG. 8, a flowchart of a method 800 is shown according to one aspect. The method 800 may be performed in accordance with the present invention in any of the environments depicted in FIGS. 1-7 and 9-11, among others, in various aspects. Of course, more or fewer operations than those specifically described in FIG. 8 may be included in method 800, as would be understood by one of skill in the art upon reading the present descriptions.

Each of the steps of the method 800 may be performed by any suitable component of the operating environment. For example, in various aspects, the method 800 may be partially or entirely performed by computers, or some other device having one or more processors therein. The processor, e.g., processing circuit(s), chip(s), and/or module(s) implemented in hardware and/or software, and preferably having at least one hardware component may be utilized in any device to perform one or more steps of the method 800. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 8, method 800 includes operation 802. Operation 802 includes receiving, by a trusted verifier, inner encrypted data based at least in part on a data request from a destination node outside of an authorized encryption trust zone. The data request may include a data write request, a data read request, etc. The inner encrypted data includes data that has been encrypted in an inner key to create the inner encrypted data. In various approaches, the inner encrypted data may be interchangeably used with "first encrypted data." The inner encrypted data is preferably received at the trusted verifier from a secure transcoder, as described in detail in operation 710 of method 700. The trusted verifier may be of the type described in FIGS. 5-6 and throughout the present disclosure.

Operation 804 includes verifying an inner watermark token generated for the inner encrypted data. The inner watermark token is generated for the inner encrypted data using an inner watermark token key in a manner described above for the first watermark token generated for the first encrypted data. In preferred aspects, the trusted verifier has access to the inner watermark token key as described in detail above and verifies the inner watermark token according to at least some of the aspects described here.

In various aspects, method 800 includes, in response to a data write request, decrypting the inner encrypted data using the inner key to obtain the data (e.g., the plain text data). In preferred aspects, the data write request and subsequent decryption is performed in response to successful verification of the inner watermark in operation 804. The trusted verifier is preferably authorized to access the appropriate encryption keys (e.g., the first key, etc.) in a manner known in the art according to various authorization policies described herein.

In at least some aspects, method 800 further includes, in response to the data write request, determining that the data (e.g., the result of decrypting the inner encrypted data using the inner key to obtain the data) is unencrypted using a prefilter function. In preferred aspects, the prefilter function performs an encryption detection function which includes determining whether the data is pre-encrypted. In other aspects, the prefilter encryption detection function determines whether the data is encrypted in any encryption key. In response to determining that the data is not encrypted, the trusted verifier may block the data from further processing (e.g., an error may be output, the data may be blocked from further encryption, the write and/or read request is denied, etc.). The error may be logged and/or an alert sent to a user, as described above.

In at least some aspects, method 800 further includes, in response to receiving a data write request, returning a first verification message to a transcoder in response to successful verification of the inner watermark token and the determination that the data is unencrypted. This verification message may be analogous to the verification received in operation 712 of method 700. The transcoder may continue processing the data associated with the data write request according to at least some of the aspects described above with respect to method 700.

In other aspects, the trusted verifier also verifies an inner watermark token generated for the inner encrypted data using an inner watermark token key and returns a second verification message to the secure transcoder in response to successful verification, in a manner which would become apparent to one having ordinary skill in the art reading the present disclosure.

In one aspect, in response to successfully verifying the inner watermark token, the trusted verifier may obtain a new (e.g., different) inner watermark token key and generate a new (e.g., different) inner watermark token for the inner encrypted data. In at least one approach, the new inner watermark token may be generated using the new inner watermark token key and the inner encrypted data. The new inner watermark token may be sent to the transcoder which then sends the new inner watermark token to the authorized destination. The authorized destination preferably has access to the new inner watermark token key and additionally verifies the new inner watermark token upon receipt of the third encrypted data (e.g., inner encrypted data which is encrypted in a third encryption key at the transcoder to obtain third encrypted data). In some aspects, if the watermark token is used in generating the watermark, an authorized destination with access to the watermark token key may verify the watermark and watermark token without access to the watermark token (e.g., from the transcoder or from the data storage). In contrast, if the watermark token and watermark are independent, both the watermark and the watermark token are independently verified.

In another aspect, the watermark token used in the watermark verification is not received from the data storage, but is locally generated. For example, for an inner watermark token, the inner watermark token used in the watermark verification is generated by the trusted verifier. For an outer watermark token, the outer watermark token used in the watermark verification is generated by the secure transcoder.

In various aspects, in response to receiving a data read request, the trusted verifier generates (e.g., calculates) a new inner watermark token. In one exemplary aspect, the trusted verifier receives, from the transcoder, an inner watermark token generated for the inner encrypted data. The inner watermark token is generated for the inner encrypted data using a first inner watermark token key and the trusted verifier verifies the inner watermark token generated for the inner encrypted data according to at least some of the aspects described herein. The trusted verifier may return a second verification message to the transcoder in response to successful verification of the inner watermark token generated for the inner encrypted data as described above.

In another exemplary aspect, in response to receiving a data read request, the trusted verifier does not verify the inner watermark token (e.g., as in operation 804). Rather, the trusted verifier independently generates an inner watermark token for the inner encrypted data using a first inner watermark token key and returns the inner watermark token generated for the inner encrypted data to the transcoder.

In yet another exemplary aspect, in response to receiving a data read request, the trusted verifier obtains a second inner watermark token key (e.g., a different watermark token key than the first inner watermark token key) and generates a new inner watermark token for the inner encrypted data using the second inner watermark token key and the inner encrypted data. The trusted verifier may return the new inner watermark token generated for the inner encrypted data to the transcoder which then returns the new inner watermark token to the destination node.

Figure 9:
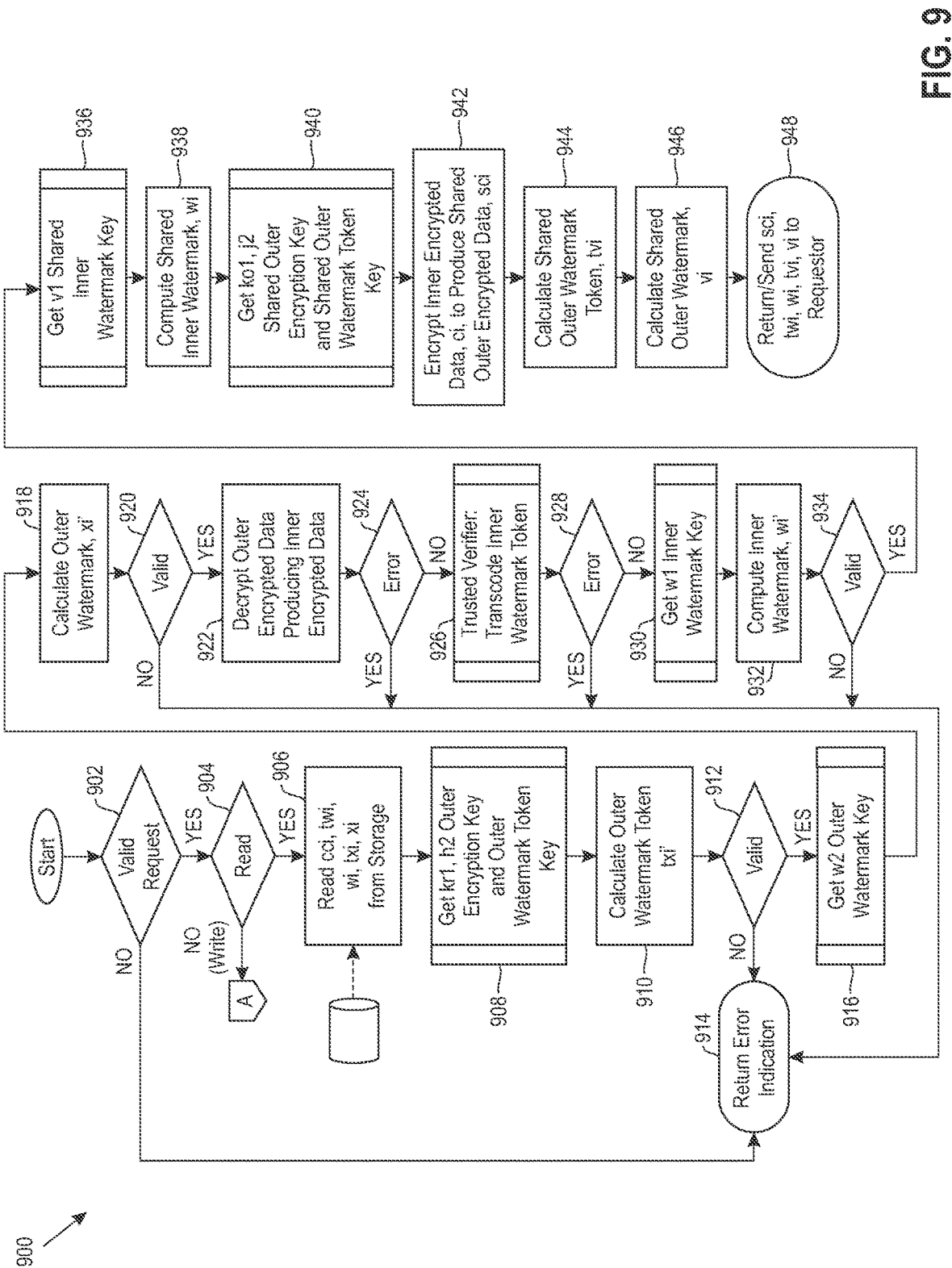
FIG. 9 is an exemplary implementation of a read request, in accordance with one aspect of the present invention.

Now referring to FIG. 9, a flowchart of an exemplary implementation 900 is shown according to one aspect. The exemplary implementation 900 may be performed in accordance with the present invention in any of the environments depicted in FIGS. 1-8 and 10-11, among others, in various aspects. Of course, more or fewer operations than those specifically described in FIG. 9 may be included in exemplary implementation 900, as would be understood by one of skill in the art upon reading the present descriptions.

Each of the steps of the exemplary implementation 900 may be performed by any suitable component of the operating environment. For example, in various aspects, the exemplary implementation 900 may be partially or entirely performed by computers, or some other device having one or more processors therein. The processor, e.g., processing circuit(s), chip(s), and/or module(s) implemented in hardware and/or software, and preferably having at least one hardware component may be utilized in any device to perform one or more steps of the exemplary implementation 900. Illustrative processors include, but are not limited to, a central processing unit (CPU), an application specific integrated circuit (ASIC), a field programmable gate array (FPGA), etc., combinations thereof, or any other suitable computing device known in the art.

The exemplary implementation 900 is for a remote read request through a transcoder. Implementation 900 uses at least some of the components described with respect to FIGS. 5 and 6. Similar definitions are described as for FIG. 3 and may have similar meaning and/or function unless otherwise indicated. Incremental numbering (e.g., such as ko1, ko2, etc.) is used to designate multiples of a component. For example, ko1 and ko2 may both refer to encryption keys, but distinct numbering represents different encryption keys, unless otherwise noted, as would become apparent one having ordinary skill in the art upon reading the present disclosure.

The exemplary implementation 900 is for the processing of a single request. A system as described herein may be capable of handling multiple requests, as would be appreciated by one having ordinary skill in the art. In at least some approaches, the exemplary implementation 900 is repeated for each of the request unless or until an error condition indicates that no additional request should be processed (e.g., a predetermined number of requests may be set according to approaches known in the art). For example, when a packet with multiple I/O requests for a file (e.g., data) is received, the requests may be executed in any order as long as the results do not differ from serially executing each request in the order in which the requests were received, in a manner which would be determinable by one having ordinary skill in the art.

The exemplary implementation initiates with decision 902. Decision 902 includes determining whether a request is a valid request (e.g., determine whether the request is from an authorized requestor, as discussed in detail above). If yes, decision 902 proceeds to decision 904 which processes the request. If the request is a write request, decision 904 proceeds to A (as shown and described in FIG. 10). If the request is a read request, decision 904 proceeds to operation 906. Decision 904 may include receiving meta data which indicates the type of request associated therewith (e.g., whether the request is a read request, a write request, etc.). Meta data as used throughout the present disclosure may refer to information which enables the determination of whether a request is valid and/or the type of request as would be understood by one having ordinary skill in the art.

Operation 906 includes reading cci, twi, wi, txi, and xi from storage. Operation 906 proceeds to operation 908 which includes getting kr1, h2 (e.g., the outer encryption key and outer watermark token key, respectively) from one or more key servers according to aspects described herein. Operation 908 proceeds to operation 910 which includes calculating the outer watermark token, txi', according to the various aspects described herein. Decision 912 includes verifying whether the outer watermark token, txi', is valid. Determining whether the txi' is valid preferably includes determining whether txi' matches txi. If the outer watermark token is not valid (e.g., the verification is unsuccessful), decision 912 returns an error indication at operation 914. If the outer watermark token is valid, decision 912 proceeds to operation 916.

Operation 916 includes getting the outer watermark key, w2, from a key server according to the various aspects described herein. Operation 916 proceeds to operation 918 which includes calculating outer watermark, xi'. Operation 918 proceeds to decision 920 which includes verifying whether the outer watermark, xi', is valid. Determining whether the outer watermark, xi', is valid preferably includes determining whether xi' matches xi. If the outer watermark, xi', is valid, decision 920 proceeds to operation 922. If the outer watermark, xi', is not valid, decision 920 returns an error indication at operation 914.

Operation 922 includes decrypting outer encrypted data (e.g., cci) to produce the inner encrypted data, as described in various approaches described herein. If there is an error in the decryption at decision 924, an error indication may be returned at operation 914. If there is no error at decision 924, decision 924 proceeds to operation 926. Operation 926 includes transcoding the inner watermark token using a trusted verifier as would become apparent to one having ordinary skill in the art upon reading the present disclosure (see FIG. 11). Operation 926 proceeds to decision 928. If there is an error in transcoding the inner watermark at decision 928, an error indication may be returned at operation 914. If there is no error detected at decision 928, decision 928 proceeds to operation 930.

Operation 930 includes getting inner watermark key, w1, from a key server according to various aspects described herein. Operation 930 proceeds to operation 932 which includes computing the inner watermark, wi', using at least the inner watermark key. Following computation of the inner watermark, decision 934 includes verifying whether the inner watermark is valid. If the inner watermark is valid, decision 934 proceeds to operation 936. If the inner watermark is not valid, decision 934 returns an error indication at operation 914.

Operation 936 includes getting shared inner watermark key, v1, from a key server, as described herein. Operation 936 proceeds to operation 938 which includes computing a shared inner watermark, wi. Operation 938 proceeds to operation 940 which includes getting ko1 and j2, a shared outer encryption key and a shared outer watermark token key, respectively, from one or more key servers, according to at least some of the aspects described herein. Operation 940 proceeds to operation 942 which includes encrypting inner encrypted data, ci, to produce shared outer encrypted data, sci, as described above. Operation 942 proceeds to operation 944 which includes calculating a shared outer watermark token, tvi, as described above. Operation 944 proceeds to operation 946 which includes calculating a shared outer watermark, vi, as described above. Operation 946 proceeds to operation 948 which includes returning and/or sending sci, twi, wi, tvi, vi, to the requestor.

Figure 10:
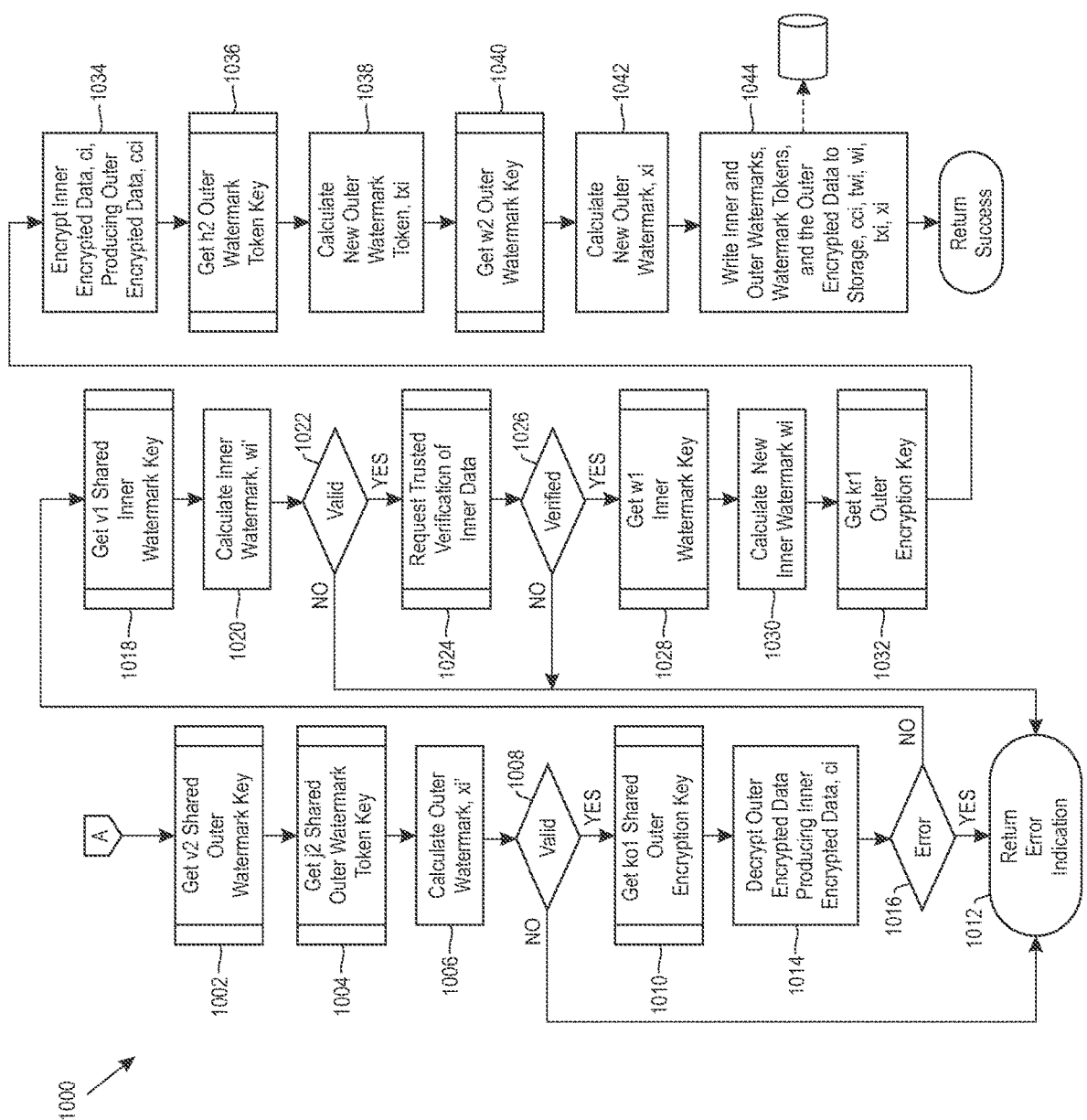
FIG. 10 is an exemplary implementation of a write request, in accordance with one aspect of the present invention.

Now referring to FIG. 10, a flowchart of an exemplary implementation 1000 is shown according to one aspect. The exemplary implementation 1000 may be performed in accordance with the present invention in any of the environments depicted in FIGS. 1-9 and 11, among others, in various aspects. Of course, more or fewer operations than those specifically described in FIG. 10 may be included in exemplary implementation 1000, as would be understood by one of skill in the art upon reading the present descriptions.

Each of the steps of the exemplary implementation 1000 may be performed by any suitable component of the operating environment. For example, in various aspects, the exemplary implementation 1000 may be partially or entirely performed by computers, or some other device having one or more processors therein. The processor, e.g., processing circuit(s), chip(s), and/or module(s) implemented in hardware and/or software, and preferably having at least one hardware component may be utilized in any device to perform one or more steps of the exemplary implementation 1000. Illustrative processors include, but are not limited to, a central processing unit (CPU), an application specific integrated circuit (ASIC), a field programmable gate array (FPGA), etc., combinations thereof, or any other suitable computing device known in the art.

The exemplary implementation 1000 is for a remote write request of shared data through a transcoder. Implementation 1000 uses at least some of the components described with respect to FIGS. 5 and 6. Similar definitions are described as for FIG. 3 and may have similar meaning and/or function unless otherwise indicated. Incremental numbering (e.g., such as ko1, ko2, etc.) is used to designate multiples of a component. For example, ko1 and ko2 may both refer to encryption keys, but distinct numbering represents different encryption keys, unless otherwise noted, as would become apparent one having ordinary skill in the art upon reading the present disclosure.

Operation 1002 includes getting shared outer watermark key, v2, from a key server in a manner described in various aspects of the present disclosure. Operation 1002 proceeds to operation 1004 which includes getting shared outer watermark token key, j2, from a key server (the same or different key server) in a manner described in various aspects of the present disclosure. Operation 1004 proceeds to operation 1006 which includes calculating an outer watermark, xi', in a manner which would become apparent to one having ordinary skill in the art upon reading the present disclosure. Operation 1006 proceeds to decision 1008 which determines whether the outer watermark is valid. If the outer watermark is valid, decision 1008 proceeds to operation 1010. If the outer watermark is not valid, decision 1008 returns an error indication at operation 1012 according to the various aspects described herein.

Operation 1010 includes getting a shared outer encryption key, ko1, from a key server as described herein. Operation 1010 proceeds to operation 1014 which includes decrypting outer encrypted data to produce inner encrypted data, ci, in a manner which would become apparent to one having ordinary skill in the art upon reading the present disclosure. Operation 1014 proceeds to decision 1016 which determines whether an error occurred in decrypting the outer encrypted data. If no error occurred, decision 1016 proceeds to operation 1018. If an error occurred, decision 1016 returns an error indication in operation 1012.

Operation 1018 includes getting shared inner watermark key, v1, from a key server as described herein. Operation 1018 proceeds to operation 1020 which includes calculating inner watermark, wi'. Decision 1022 determines whether the inner watermark is valid. If the inner watermark is valid, decision 1022 proceeds to operation 1024. If the inner watermark is not valid, decision 1022 returns an error indication in operation 1012.

Operation 1024 includes requesting trusted verification of the inner encrypted data. In preferred aspects, a trusted verifier performs decision 1026 which determines whether the inner encrypted data is verified, according to at least some of the aspects described herein (see FIG. 11). If the inner encrypted data is verified, decision 1026 proceeds to operation 1028. If the inner encrypted data is not verified, decision 1026 returns an error indication at operation 1012.

Operation 1028 includes getting inner watermark key, w1, from a key server as described above. Operation 1028 proceeds to operation 1030 which includes calculating the new inner watermark, wi, using at least the inner watermark key, as would become apparent to one having ordinary skill in the art upon reading the present disclosure. Operation 1030 proceeds to operation 1032 which includes getting outer encryption key kr1, from a key server, as described above. Operation 1032 proceeds to operation 1034 which includes encrypting the inner encrypted data, ci, to generate outer encrypted data, cci, in a manner which would become apparent to one having ordinary skill in the art upon reading the present disclosure. Operation 1034 proceeds to operation 1036 which includes getting outer watermark token key, h2, from a key server as described above. Operation 1036 proceeds to operation 1038 which includes calculating new outer watermark token, txi, in a manner which would become apparent to one having ordinary skill in the art in view of the present disclosure. Operation 1038 proceeds to operation 1040 which includes getting outer watermark key, w2, from a key server as described above. Operation 1040 proceeds to operation 1042 which includes calculating a new outer watermark, xi, using at least the outer watermark key, in a manner which would become apparent to one having ordinary skill in the art upon reading the present disclosure. Operation 1042 proceeds to operation 1044 which includes writing inner and outer watermarks, inner and outer watermark tokens, and the outer encrypted data to the storage (e.g., cci, twi, wi, txi, xi, etc.) as part of the remote write of shared data through a transcoder.

Figure 11:
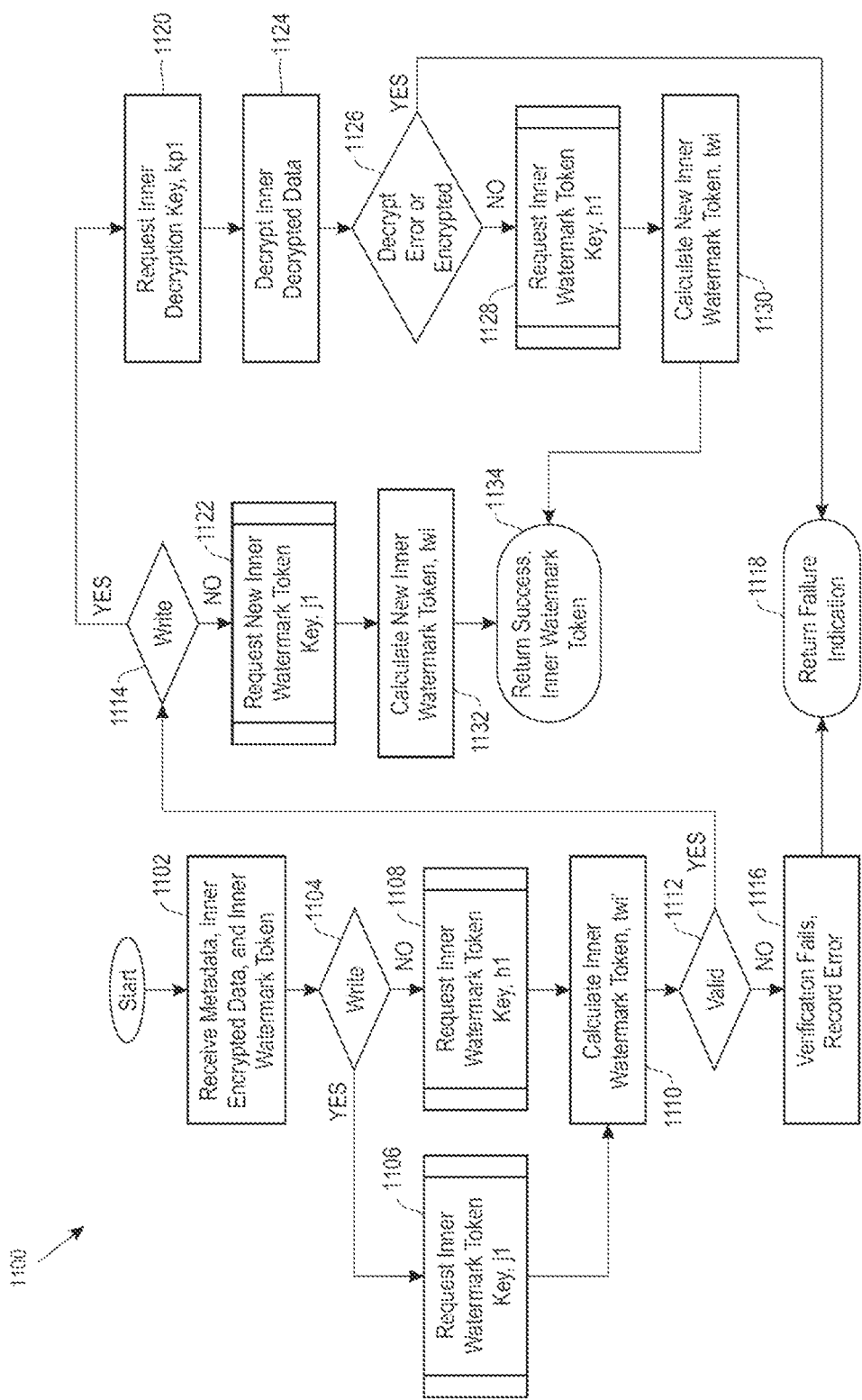
FIG. 11 is an exemplary implementation of a trusted verifier, in accordance with one aspect of the present invention.

Now referring to FIG. 11, a flowchart of an exemplary implementation 1100 is shown according to one aspect. The exemplary implementation 1100 may be performed in accordance with the present invention in any of the environments depicted in FIGS. 1-10, among others, in various aspects. Of course, more or fewer operations than those specifically described in FIG. 11 may be included in exemplary implementation 1100, as would be understood by one of skill in the art upon reading the present descriptions.

Each of the steps of the exemplary implementation 1100 may be performed by any suitable component of the operating environment. For example, in various aspects, the exemplary implementation 1100 may be partially or entirely performed by computers, or some other device having one or more processors therein. The processor, e.g., processing circuit(s), chip(s), and/or module(s) implemented in hardware and/or software, and preferably having at least one hardware component may be utilized in any device to perform one or more steps of the exemplary implementation 1100. Illustrative processors include, but are not limited to, a central processing unit (CPU), an application specific integrated circuit (ASIC), a field programmable gate array (FPGA), etc., combinations thereof, or any other suitable computing device known in the art.

The exemplary implementation 1100 depicts various exemplary operations of a trusted verifier. Implementation 1100 uses at least some of the components described with respect to FIGS. 5 and 6. Similar definitions are described as for FIG. 3 and may have similar meaning and/or function unless otherwise indicated. Incremental numbering (e.g., such as ko1, ko2, etc.) is used to designate multiples of a component. For example, ko1 and ko2 may both refer to encryption keys, but distinct numbering represents different encryption keys, unless otherwise noted, as would become apparent one having ordinary skill in the art upon reading the present disclosure.

Operation 1102 includes receiving meta data, inner encrypted data, and an inner watermark token at the trusted verifier, from a transcoder, according to any of the approaches described in detail above. The meta data indicates the type of operation requested. Operation 1102 proceeds to decision 1104 which processes the request. If the request is a write request, decision 1104 proceeds to operation 1106. If the request is a read request, decision 1104 proceeds to operation 1108. At operation 1106, the inner watermark token key, j1, is requested. At operation 1108, the inner watermark token key, h1, is requested. Both decision 1104 and operation 1108 proceed to operation 1110 which calculates the inner watermark token, twi', using the appropriate key requested in the previous operation, in a manner which would become apparent to one having ordinary skill in the art upon reading the present disclosure.

Operation 1110 proceeds to decision 1112 which determines whether the inner watermark token, twi', is valid. Determining whether the inner watermark token is valid preferably includes determining whether twi' matches twi. If the inner watermark token is valid, decision 1112 proceeds to decision 1114. If the inner watermark token is not valid, the verification fails at operation 1116. An error indication may be returned at operation 1118 according to at least some of the aspects described herein.

Decision 1114 further processes the request (e.g., based at least in part on the meta data). If the request is a write request, decision 1114 proceeds to operation 1120. If the request is a read request, decision 1114 proceeds to operation 1122. At operation 1120, the inner decryption key, kp1, is requested. At operation 1122, a new inner watermark token key, j1, is requested.

Operation 1120 proceeds to operation 1124 which uses the inner decryption key, kp1, requested in operation 1120 to decrypt the inner encrypted data to obtain the plain text data, in a manner which would become apparent to one having ordinary skill in the art upon reading the present disclosure. Decision 1126 determines whether there are any decryption errors and/or whether the data is encrypted. If there are any errors and/or the data is still encrypted (e.g., such as by an attacker having substituted encrypted text for plain text, etc.), decision 1126 returns an error indication at operation 1118. If there are no errors and the data is in the clear, decision 1126 proceeds to operation 1128 which includes requesting inner watermark token key, h1. Operation 1128 proceeds to operation 1130 which includes calculating new inner watermark token, twi, using the inner watermark token key, h1, requested in operation 1128, in a manner which would become apparent to one having ordinary skill in the art upon reading the present disclosure.

Operation 1122 similarly proceeds to operation 1132 which includes calculating new inner watermark token, twi, using the inner watermark token key, j1, requested in operation 1122, in a manner which would become apparent to one having ordinary skill in the art upon reading the present disclosure. Both operation 1132 and operation 1130 proceed to operation 1134 which includes returning an indication of the successful verification and/or the new inner watermark token to the transcoder, according to various aspects of the present disclosure.

In an alternative aspect, the watermark token used in the watermark verification is not received from storage, but is locally generated by the trusted verifier. The trusted verifier may regenerate the inner watermark token using a new (e.g., second) inner watermark token key and passes the new inner watermark token to the secure transcoder. The secure transcoder verifies the inner watermark token (e.g., generated using a first inner watermark token key) and the new inner watermark token (e.g., generated using the new inner watermark token key).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
    an authenticated encryption layer comprising one or more hardware processors, and logic configured to cause the one or more hardware processors to:
        encrypt data received at the authenticated encryption layer from an authorized application at a source node, the data being encrypted using a first key to obtain first encrypted data;
        encrypt the first encrypted data using a second key to obtain double encrypted second encrypted data;
        generate a watermark for the first encrypted data and/or a watermark for the second encrypted data, wherein each generated watermark is generated using the associated encrypted data and a respective watermark key that is different than the first key and different than the second key;
        generate a watermark token for the first encrypted data and/or a watermark token for the second encrypted data; and
        outputting the second encrypted data, the watermark(s), and the watermark token(s) to a second system.

2. The system of claim 1, wherein the watermark is created for the first encrypted data; and comprising: a trusted verifier, wherein the trusted verifier is configured to verify the watermark generated for the first encrypted data, wherein the trusted verifier is configured to send a verification of the watermark generated for the first encrypted data to a transcoder.

3. The system of claim 1, wherein the authenticated encryption layer comprises logic configured to cause the second encrypted data and the generated watermark(s) to be stored in data storage, each generated watermark being generated using the respective watermark key and hashing the encrypted data.

4. The system of claim 3, wherein the authenticated encryption layer comprises logic configured to cause the generated watermark token(s) to be stored in the data storage, each generated watermark token being generated using a respective watermark token key.

5. The system of claim 3, wherein the authenticated encryption layer comprises logic configured to generate the watermark for the second encrypted data, wherein the data storage has access to the watermark key associated with the watermark generated for the second encrypted data, wherein the data storage is configured to verify the watermark generated for the second encrypted data using the watermark key associated with the watermark generated for the second encrypted data, wherein the data storage is configured to store the second encrypted data and the generated watermark(s) only upon successful verification of the watermark generated for the second encrypted data.

6. The system of claim 3, comprising: a transcoder, wherein the authenticated encryption layer comprises logic configured to generate the watermark for the second encrypted data, wherein the transcoder comprises logic configured to: read the second encrypted data and the watermark generated for the second encrypted data from the data storage; and verify the watermark generated for the second encrypted data using the watermark key associated with the watermark generated for the second encrypted data.

7. The system of claim 3, comprising: a transcoder, wherein the authenticated encryption layer comprises logic configured to generate the watermark for the first encrypted data, wherein the transcoder comprises logic configured to: read the second encrypted data and the watermark generated for the first encrypted data from the data storage, wherein the transcoder is configured to decrypt the second encrypted data to obtain the first encrypted data using the first key, wherein the transcoder is configured to verify the watermark generated for the first encrypted data using the watermark key associated with the watermark generated for the first encrypted data.

8. The system of claim 1, wherein the watermarks are generated for the first encrypted data and the second encrypted data, wherein the watermark tokens are generated for the first encrypted data and the second encrypted data.

9. The system of claim 4, comprising: a transcoder, wherein the authenticated encryption layer comprises logic configured to generate the watermark token for the first encrypted data, wherein the transcoder comprises logic configured to: read the second encrypted data and the watermark token generated for the first encrypted data from the data storage, wherein the transcoder is configured to decrypt the second encrypted data to obtain the first encrypted data using the first key, wherein the transcoder is configured to verify the watermark token generated for the first encrypted data using the watermark token key associated with the watermark token generated for the first encrypted data.

10. The system of claim 7, comprising: a second transcoder, wherein the second transcoder comprises logic configured to: encrypt the first encrypted data to create third encrypted data using a third key, wherein the transcoder is configured to generate a watermark for the third encrypted data using a watermark key associated with the third encrypted data; and send the third encrypted data and any generated watermarks to an authorized destination.

11. The system of claim 10, wherein the authorized destination comprises logic configured to: verify the watermark generated for the third encrypted data using the watermark key associated with the third encrypted data, decrypt the third encrypted data using the third key to obtain the first encrypted data, verify the watermark generated for the first encrypted data using the watermark key associated with the watermark generated for the first encrypted data; and decrypt the first encrypted data to obtain the data using the first key in response to successful verification of the watermark generated for the third encrypted data and the watermark generated for the first encrypted data.

12. A computer-implemented method comprising:
receiving second encrypted data, watermarks, and a first watermark token from data storage in response to a data request from a destination node outside of an authorized encryption trust zone,
wherein the second encrypted data is data that has been encrypted in a first key to create first encrypted data that is then encrypted in a second key to create the second encrypted data,
wherein the watermarks include a first watermark generated for the first encrypted data and a second watermark generated for the second encrypted data,
wherein the first watermark token is generated for the first encrypted data;
verifying the second watermark generated for the second encrypted data;
in response to verification of the second watermark, decrypting the second encrypted data using the second key to obtain the first encrypted data;
verifying the first watermark generated for the first encrypted data;
in response to verification of the first watermark, sending the first encrypted data to a trusted verifier, wherein the trusted verifier is configured to verify the first watermark token generated for the first encrypted data;
in response to receiving verification of the first watermark token generated for the first encrypted data from the trusted verifier, encrypting the first encrypted data with a third key to create third encrypted data;
generating a third watermark and/or a third watermark token for the third encrypted data; and
sending the third encrypted data, the watermarks, and the watermark token(s), including the third watermark and/or the third watermark token, to an authorized destination.

13. The computer-implemented method of claim 12, wherein the trusted verifier is configured to decrypt the first encrypted data using the first key to obtain the data.

14. The computer-implemented method of claim 12, wherein the trusted verifier includes a prefilter function configured to verify that the data is not encrypted, wherein the trusted verifier only sends the verification in response to successful verification that the data is not encrypted.

15. A computer-implemented method comprising:
receiving, by a trusted verifier from a transcoder, inner encrypted data based at least in part on a data request from a destination node outside of an authorized encryption trust zone,
wherein the inner encrypted data is data that has been encrypted in an inner key to create the inner encrypted data;
verifying, by the trusted verifier, an inner watermark token generated for the inner encrypted data;
generating, by the trusted verifier, a new inner watermark token in response to verifying that the inner watermark token is valid;
sending, by the trusted verifier, the new inner watermark token to the transcoder; and
returning an error indication in response to failure to verify that the inner watermark token is valid.

16. The computer-implemented method of claim 15, wherein the data request is a data write request; the method comprising:
in response to successful verification of the inner watermark token, decrypting, by the trusted verifier, the inner encrypted data using the inner key to obtain the data;
determining, by the trusted verifier, that the data is unencrypted using a prefilter function; and
returning, by the trusted verifier, a first verification message to the transcoder in response to successful verification of the inner watermark token and the determination that the data is unencrypted.

17. The computer-implemented method of claim 15, wherein the data request is a data read request.

18. The computer-implemented method of claim 15, comprising receiving, by the trusted verifier, from a transcoder, the inner watermark token generated for the inner encrypted data, wherein the inner watermark token is generated for the inner encrypted data using a first inner watermark token key; verifying, by the trusted verifier, the inner watermark token generated for the inner encrypted data; and returning, by the trusted verifier, a second verification message to the transcoder in response to successful verification of the inner watermark token generated for the inner encrypted data.

19. The computer-implemented method of claim 15, wherein the verifying of the inner watermark token generated for the inner encrypted data by the trusted verifier includes generating, by the trusted verifier, the inner watermark token, wherein the inner watermark token is generated for the inner encrypted data, by the trusted verifier, using a first inner watermark token key; and comprising returning, by the trusted verifier, the inner watermark token generated for the inner encrypted data to the transcoder.

20. The computer-implemented method of claim 17, comprising obtaining, by the trusted verifier, a second inner watermark token key, wherein the second inner watermark token key is used to generate the new inner watermark token for the inner encrypted data; and returning, by the trusted verifier, the new inner watermark token generated for the inner encrypted data to the transcoder.

* * * * *